US012585940B2

(12) United States Patent
Rasch et al.

(10) Patent No.: US 12,585,940 B2
(45) Date of Patent: Mar. 24, 2026

(54) LEARNING STATIC BOUND MANAGEMENT PARAMETERS FOR ANALOG RESISTIVE PROCESSING UNIT SYSTEM

(71) Applicant: International Business Machines Corporation, Armonk, NY (US)

(72) Inventors: Malte Johannes Rasch, Chappaqua, NY (US); Manuel Le Gallo-Bourdeau, Zurich (CH); HsinYu Tsai, San Jose, CA (US); Charles Mackin, San Jose, CA (US); Nandakumar Sasidharan Rajalekshmi, Thiruvananthapuram (IN); An Chen, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 1216 days.

(21) Appl. No.: 17/485,342

(22) Filed: Sep. 25, 2021

(65) Prior Publication Data

US 2023/0097217 A1     Mar. 30, 2023

(51) Int. Cl.
*G06N 3/08*          (2023.01)
*G06F 17/16*         (2006.01)
*G06N 3/065*         (2023.01)

(52) U.S. Cl.
CPC .............. *G06N 3/08* (2013.01); *G06F 17/16* (2013.01); *G06N 3/065* (2023.01)

(58) Field of Classification Search
CPC .......... G06F 17/16; G06F 7/5443; G06F 5/01; G06G 7/16; G06N 3/065; G06N 3/08; G06N 3/084; G11C 11/54
See application file for complete search history.

(56) References Cited

U.S. PATENT DOCUMENTS

| | | | |
|---|---|---|---|
| 9,646,243 B1 | 5/2017 | Gokem | |
| 10,741,611 B1 | 8/2020 | Leobandung | |
| 10,860,918 B2 | 12/2020 | Tran et al. | |
| 12,169,534 B2 * | 12/2024 | Rasch .................... | G06N 3/065 |
| 2017/0109628 A1 * | 4/2017 | Gokmen ................ | G06N 3/047 |
| 2018/0293209 A1 * | 10/2018 | Gokmen ................ | G06F 7/535 |

(Continued)

OTHER PUBLICATIONS

M. J. Rasch, T. Gokmen and W. Haensch, "Training Large-scale Artificial Neural Networks on Simulated Resistive Crossbar Arrays," in IEEE Design & Test, vol. 37, No. 2, pp. 19-29, Apr. 2020 (Year: 2020).*

(Continued)

*Primary Examiner* — Matthew D Sandifer
(74) *Attorney, Agent, or Firm* — Kimberly Zillig; Ryan, Mason & Lewis, LLP

(57)          ABSTRACT

Techniques are provided for learning static bound management parameters for an analog resistive processing unit system which is configured for neuromorphic computing. For example, a system comprises one or more processors which are configured to: perform a first training process to train a first artificial neural network model; perform a second training process to retrain the first artificial neural network model using matrix-vector compute operations which are a function of bound management parameters of an analog resistive processing unit system, to thereby generate a second artificial neural network model with learned static bound management parameters; and configure the resistive processing unit system to implement the second artificial neural network model and the learned static bound management parameters.

20 Claims, 11 Drawing Sheets

(56)                References Cited

U.S. PATENT DOCUMENTS

| | | | | |
|---|---|---|---|---|
| 2019/0122105 | A1* | 4/2019 | Boybat Kara | G06N 3/048 |
| 2019/0138882 | A1* | 5/2019 | Choi | G06N 3/048 |
| 2019/0294416 | A1* | 9/2019 | Hu | G11C 7/16 |
| 2020/0065650 | A1 | 2/2020 | Tran et al. | |
| 2020/0258942 | A1 | 8/2020 | Leobandung | |
| 2020/0327406 | A1* | 10/2020 | Piveteau | G06N 3/08 |
| 2020/0380348 | A1* | 12/2020 | Rasch | G06N 3/084 |
| 2020/0380349 | A1* | 12/2020 | Rasch | G06N 3/065 |
| 2021/0081775 | A1 | 3/2021 | Leobandung et al. | |
| 2022/0374688 | A1* | 11/2022 | Wu | G06N 3/08 |

OTHER PUBLICATIONS

T. Gokmen, M. Onen, and W. Haensch, "Training deep convolutional neural networks with resistive cross-point devices," Front. Neurosci., vol. 11, p. 538, 2017 (Year: 2017).*

P. M. Solomon, "Analog Neuromorphic Computing Using Programmable Resistor Arrays," Solid-State Electronics vol. 155, Mar. 26, 2019, pp. 82-92.

B. Zhang et al., "Neural Network Training With Stochastic Hardware Models and Software Abstractions," IEEE Transactions on Circuits and Systems I: Regular Papers, vol. 68, No. 4, Apr. 2021, pp. 1532-1542.

H. Assaf et al., "Vector Matrix Multiplication Using Crossbar Arrays: A Comparative Analysis," 2018 25th IEEE International Conference on Electronics, Circuits and Systems (ICECS), pp. 609-612.

T. Gokmen et al., "Acceleration of Deep Neural Network Training with Resistive Cross-Point Devices: Design Considerations," Frontiers in Neuroscience, vol. 10, No. 333, Jul. 21, 2016, 13 pages.

P. Mell et al., "The NIST Definition of Cloud Computing," Recommendations of the National Institute of Standards and Technology, Special Publication 800-145, Sep. 2011, 7 pages.

* cited by examiner

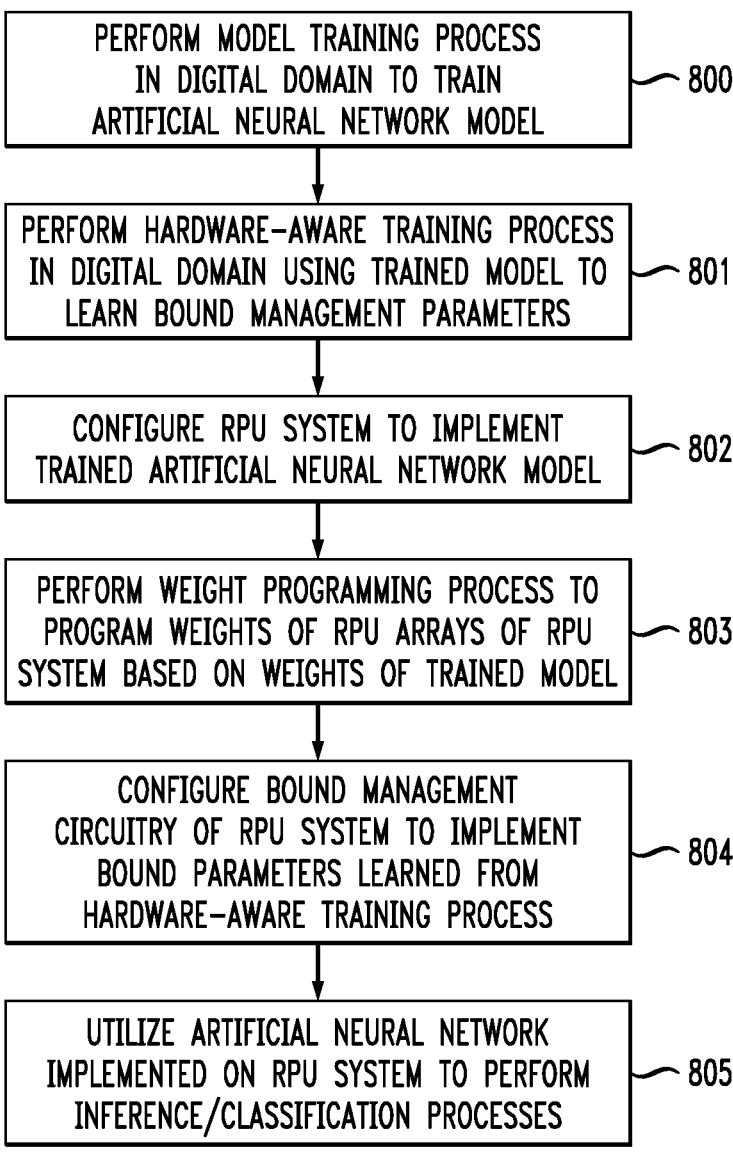

PERFORM MODEL TRAINING PROCESS
IN DIGITAL DOMAIN TO TRAIN
ARTIFICIAL NEURAL NETWORK MODEL — 800

PERFORM HARDWARE-AWARE TRAINING PROCESS
IN DIGITAL DOMAIN USING TRAINED MODEL TO
LEARN BOUND MANAGEMENT PARAMETERS — 801

CONFIGURE RPU SYSTEM TO IMPLEMENT
TRAINED ARTIFICIAL NEURAL NETWORK MODEL — 802

PERFORM WEIGHT PROGRAMMING PROCESS TO
PROGRAM WEIGHTS OF RPU ARRAYS OF RPU
SYSTEM BASED ON WEIGHTS OF TRAINED MODEL — 803

CONFIGURE BOUND MANAGEMENT
CIRCUITRY OF RPU SYSTEM TO IMPLEMENT
BOUND PARAMETERS LEARNED FROM
HARDWARE-AWARE TRAINING PROCESS — 804

UTILIZE ARTIFICIAL NEURAL NETWORK
IMPLEMENTED ON RPU SYSTEM TO PERFORM
INFERENCE/CLASSIFICATION PROCESSES — 805

LEARNING STATIC BOUND MANAGEMENT PARAMETERS FOR ANALOG RESISTIVE PROCESSING UNIT SYSTEM

BACKGROUND

This disclosure relates generally to analog resistive processing unit (RPU) systems for neuromorphic computing and, in particular, to noise and signal management techniques for analog RPU systems. Information processing systems such as neuromorphic computing systems and artificial neural network systems are utilized in various applications such as machine learning and inference processing for cognitive recognition and computing. Such systems are hardware-based systems that generally include a large number of highly interconnected processing elements (referred to as "artificial neurons") which operate in parallel to perform various types of computations. The artificial neurons (e.g., pre-synaptic neurons and post-synaptic neurons) are connected using artificial synaptic devices which provide synaptic weights that represent connection strengths between the artificial neurons. The synaptic weights can be implemented using an array of RPU cells having tunable resistive memory devices (e.g., tunable conductance), wherein the conductance states of the RPU cells are encoded or otherwise mapped to the synaptic weights.

SUMMARY

Embodiments of the disclosure include techniques for learning static bound management parameters for an analog resistive processing unit system which is configured for neuromorphic computing. For example, an exemplary embodiment of the disclosure includes a system which comprises one or more processors which are configured to: perform a first training process to train a first artificial neural network model; perform a second training process to retrain the first artificial neural network model using matrix-vector compute operations which are a function of bound management parameters of an analog resistive processing unit system, to thereby generate a second artificial neural network model with learned static bound management parameters; and configure the resistive processing unit system to implement the second artificial neural network model and the learned static bound management parameters.

Other embodiments will be described in the following detailed description of exemplary embodiments, which is to be read in conjunction with the accompanying figures.

BRIEF DESCRIPTION OF THE DRAWINGS

FIG. 1 schematically illustrates a computing system which is configured to learn static bound management parameters for an analog resistive processing unit system, according to an exemplary embodiment of the disclosure.

FIG. 8 illustrates a flow diagram of a method for configuring a resistive processing unit system to implement a trained artificial neural network and learned bound management parameters for inference processing, according to an exemplary embodiment of the disclosure.

FIG. 10 schematically illustrates an exemplary architecture of a computing node which can host the computing system of FIG. 1, according to an exemplary embodiment of the disclosure.

DETAILED DESCRIPTION

Figure 2:
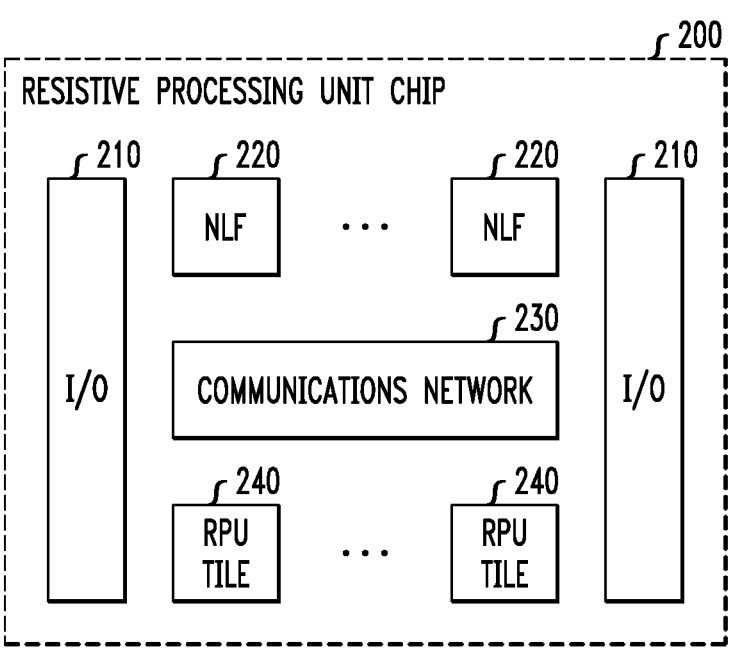
FIG. 2 schematically illustrates a resistive processing unit device which can be implemented in the system of FIG. 1, according to an exemplary embodiment of the disclosure.

Embodiments of the invention will now be described in further detail with regard to systems and methods for learning static bound management parameters for an analog resistive processing unit system which is configured for neuromorphic computing (e.g., inference/classification processing). It is to be understood that the various features shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration." Any embodiment or design described herein as "exemplary" is not to be construed as preferred or advantageous over other embodiments or designs.

Further, it is to be understood that the phrase "configured to" as used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, wherein the hardware may comprise discrete circuit elements (e.g., transistors, inverters, etc.), programmable elements (e.g., application specific integrated circuit (ASIC) chips, field-programmable gate array (FPGA) chips, etc.),processing devices (e.g., central processing units (CPUs), graphics processing units (GPUs), etc.), one or more integrated circuits, and/or combinations thereof. Thus, by way of example only, when a circuit, structure, element, component, etc., is defined to be configured to provide a specific functionality, it is intended to cover, but not be limited to, embodiments where the circuit, structure, element, component, etc., is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit, structure, element, component, etc., is in a non-operational state (e.g., not connected nor otherwise deployed in a system, not powered on, not receiving an input, and/or not producing an output) or in a partial operational state.

Figure 1:
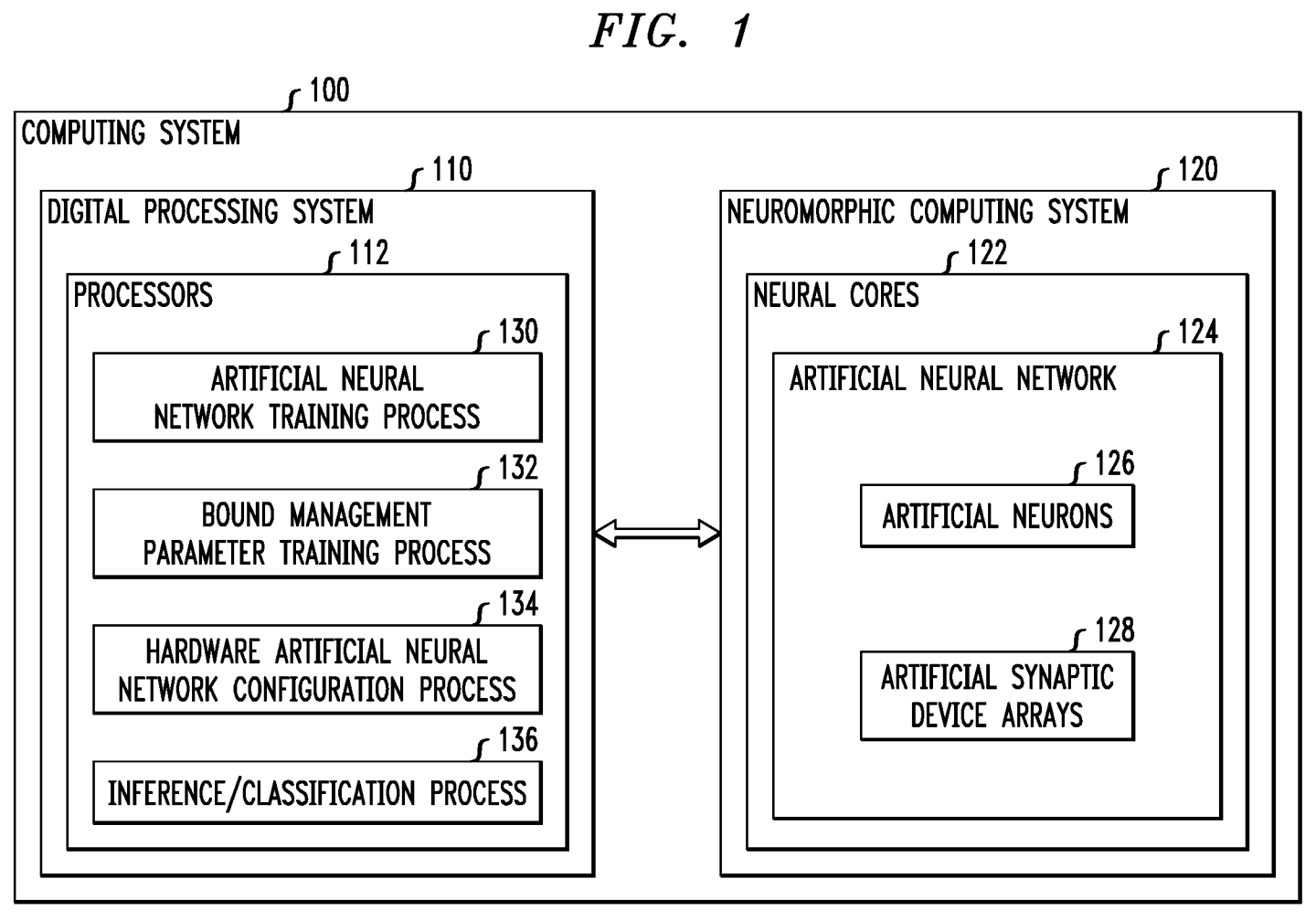

FIG. 1 schematically illustrates a computing system which is configured to learn static bound management parameters for an analog resistive processing unit system, according to an exemplary embodiment of the disclosure. In particular, FIG. 1 schematically illustrates a computing system 100 which comprises a digital processing system 110, and a neuromorphic computing system 120. The digital processing system 110 comprises a plurality of processors 112. The neuromorphic computing system 120 comprises a plurality of neural cores 122. The neural cores 122 are configured to implement an artificial neural network 124 which comprises artificial neurons 126 and artificial synaptic device arrays 128. The artificial neural network 124 can be any type of neural network including, but not limited to, a feed-forward neural network (e.g., a Deep Neural Network (DNN), a Convolutional Neural Network (CNN), etc.), a Recurrent Neural Network (RNN) (e.g., a Long Short-Term Memory (LSTM) neural network), etc. In some embodiments, as explained in further detail below, the neuromorphic computing system 120 comprises an RPU system in which the neural cores are implemented using one or more of RPU devices (e.g., RPU chips) and RPU compute nodes.

In general, the artificial neural network 124 comprises a plurality of layers which comprise the artificial neurons 126, wherein the layers include an input layer, an output layer, and one or more hidden model layers between the input and output layers. Each layer is connected to another layer using an array of artificial synaptic devices which provide synaptic weights that represent connection strengths between artificial neurons in one layer with the artificial neurons in another layer. The input layer of the artificial neural network 124 comprises artificial input neurons, which receive initial data that is input to the artificial neural network for further processing by subsequent hidden model layers of artificial neurons. The hidden layers perform various computations, depending on type and framework of the artificial neural network 124. The output layer (e.g., classification layer) implements an activation function and produces the classification/predication results for given inputs. Depending on the type of artificial neural network, the layers of the artificial neural network 124 can be configured to perform matrix-vector multiplication compute operations ($y=Wx$) for a forward pass operation, or configured to perform suitable activation function computations ($y=\sigma(x)$) for a forward pass operation.

More specifically, depending on the type of artificial neural network, the layers of the artificial neural network 124 can include functional layers including, but not limited to, fully connected (FC) layers, activation layers, convolutional layers, pooling layers, normalization layers, etc. As is known in the art, an FC layer in a neural network is a layer in which all the inputs from the layer are connected to every activation unit of the next layer. An activation layer in a neural network comprises activation functions which define how a weighted sum of an input is transformed into an output from a node or nodes in a layer of the network. For example, activation functions include, but are not limited to, a rectifier or ReLU activation function, a sigmoid activation function, a hyperbolic tangent (tanH) activation function, softmax activation function, etc. A convolutional layer applies a "convolution operation" to an input dataset and passes the processing results to the next layer in the network. As is known in the art, a convolutional layer applies filters (alternatively referred to as neurons or kernels) across all regions of an input dataset, wherein each filter is spatially smaller than the full volume of the input data set. The filters of a convolutional layer each comprise a set of learnable parameters (or weights), which are learned using a deep learning model training process. A convolutional layer utilizes a set of filters to perform a forward pass through an input dataset, wherein each filter slides (or convolves) across the width and height of the input volume and computes dot products between the entries of the filter and the input data at any position (i.e., receptive field). In essence, the convolution layer computes an output of neurons which are connected to corresponding local regions in the input data.

In some embodiments, the digital processing system 110 performs various methods through execution of program code by the processors 112. The processors 112 may include various types of processors that perform processing functions based on software, hardware, firmware, etc. For example, the processors 112 may comprise any number and combination of CPUs, ASICs, FPGAs, GPUs, Microprocessing Units (MPUs), deep learning accelerator (DLA), artificial intelligence (AI) accelerators, and other types of specialized processors or coprocessors that are configured to execute one or more fixed functions. The digital processing system 110 and processes 112 can be implemented on a single compute node, or implemented on a plurality of compute nodes that are distributed over a communications network.

The digital processing system 110 executes various processes including, but not limited to, an artificial neural network training process 130, a bound management parameter training process 132, a hardware artificial neural network configuration process 134, and an inference/classification process 136. The processors 112 of the digital processing system 110 are configured to (i) perform a first training process to train a first artificial neural network model, (ii) perform a second training process to retrain the first artificial neural network model using matrix-vector compute operations which are a function of bound management parameters of an analog resistive processing unit system, to thereby generate a second artificial neural network model with learned static bound management parameters, (iii) configure a resistive processing unit system to implement the second artificial neural network model and the learned static bound management parameters, and (iv)

perform classification/inference methods using the second artificial neural network implemented on the resistive processing unit system.

In particular, the artificial neural network training process 130 implements methods for training an artificial neural network model in the digital domain. The type of training process that is implemented in the digital domain depends on the type and size of the neural network model to be trained. Model training methods generally include data parallel training methods (data parallelism) and model parallel training methods (model parallelism), which can be implemented in the digital domain using CPUs and accelerator devices such as GPU devices to control the model training process flow and to perform various computations for training a digital artificial neural network model. The training process involves training synaptic weight matrices of an artificial neural network model (which are subsequently used to configure the artificial synaptic device arrays 128 (e.g., RPU arrays) of the neural cores 122.

In some embodiments, the artificial neural network training process 130 implements a backpropagation process for training an artificial neural network model. As is known in the art, the backpropagation process comprises three repeating processes including (i) a forward process, (ii) a backward process, and (iii) a model parameter update process. During the digital training process, training data are randomly sampled into mini-batches, and the mini-batches are input to the model to traverse the model in two phases: forward and backward passes. The forward pass generates predictions and calculates errors between the predictions and the ground truth. The backward pass backpropagates errors through the model to obtain gradients to update model weights. The forward and backward cycles mainly involve performing matrix-vector multiplication operations in forward and backward directions. The weight update involves performing incremental weight updates for weight values of the synaptic weight matrices of the neural network model being trained. The processing of a given mini-batch via the forward and backward phases is referred to as an iteration, and an epoch is defined as performing the forward-backward pass through an entire training dataset. The training process iterates multiple epochs until the model converges to a convergence criterion. In some embodiments, a stochastic gradient descent (SGD) process is utilized to train artificial neural networks using the backpropagation method in which an error gradient with respect to each model parameter (e.g., weight) is calculated using the backpropagation algorithm.

The bound management parameter training process 132 implements methods that are performed in the digital domain to learn static input and output scaling parameters to be applied to input/output vectors by the hardware accelerator circuitry (e.g., RPU accelerator devices) which is used to implement a hardware artificial neural network by the neural cores 122. In some embodiments, the input and output scaling parameters are learned (or trained) using a stochastic gradient descent process during a hardware-aware pre-training process. In some embodiments, the bound management parameter training process 132 implements a hardware-aware training process, which will be discussed in further detail below in conjunction with FIG. 9.

The hardware artificial neural network configuration process 134 implements methods for configuring the neural cores 122 of the neuromorphic computing system 120 to implement a hardware-based artificial neural network which corresponds to a digital artificial neural network that is trained and generated in the digital domain by the artificial neural network training process 130 and the bound manage-ment parameter training process 132. For example, as explained in further detail below, the hardware artificial neural network configuration process 134 is configured to program the artificial synaptic device arrays 128 with learned weight matrices of the trained artificial neural network model, and to program the hardware control circuitry of the neural cores 122 to implement the learned static input/output scaling parameters.

The inference/classification process 136 implements methods for performing an inference/classification process using the trained artificial neural network 124 that is implemented in hardware by the neural cores 122. The inference/classification process 136 may be implemented using the trained artificial neural network 124 for applications such as machine learning and inference processing for cognitive computing tasks such as object recognition, image recognition, speech recognition, handwriting recognition, natural language processing, etc.

As noted above, in some embodiments, the neuromorphic computing system 120 comprises an RPU system in which the neural cores 122 are implemented using one or more of RPU devices (e.g., RPU accelerator chips) and RPU compute nodes. For example, FIG. 2 schematically illustrates a resistive processing unit device 200 (or RPU chip 200) which can be implemented in the neuromorphic computing system 120 of FIG. 1, according to an exemplary embodiment of the disclosure. In some embodiments, the neural cores 122 can be implement using one or more of the RPU device 200 shown in FIG. 2. The RPU device 200 comprises an I/O interface 210, a plurality of non-linear function (NLF) compute modules 220, an intranode communications network 230, and a plurality of RPU tiles 240.

The I/O interface 210 comprises circuitry to enable off-chip I/O communication. Each RPU tile 240 comprises an array of RPU cells (or RPU array) with peripheral circuitry. The peripheral circuitry comprises bound management circuitry (which is configured to apply scaling parameters to digital input/output vectors), and other circuitry such as analog-to-digital converters, digital-to-analog converters, drivers, etc, to perform various functions. An exemplary embodiment of the RPU tiles 240 will be described in further detail below with reference to FIG. 4. The signals that are output from an RPU tile are directed to non-linear function (NLF) circuits which calculate either activation functions (i.e., sigmoid, softmax) and their derivatives as well as arithmetical operations (i.e., multiplication) depending on the application and neural network architecture. As explained in further detail below, at the tile boundary, input signals to the NLF are bounded to a certain static threshold value (e.g., learned static scaling parameter) to avoid signal saturation. For example, for neurons in hidden layers, the NLF compute modules 220 may compute a sigmoid activation function. Neurons at an output layer, may perform a softmax NLF operation. The communications network 230 enables on-chip communication through a bus or any suitable network-on-chip (NoC) communications framework.

Figure 3:
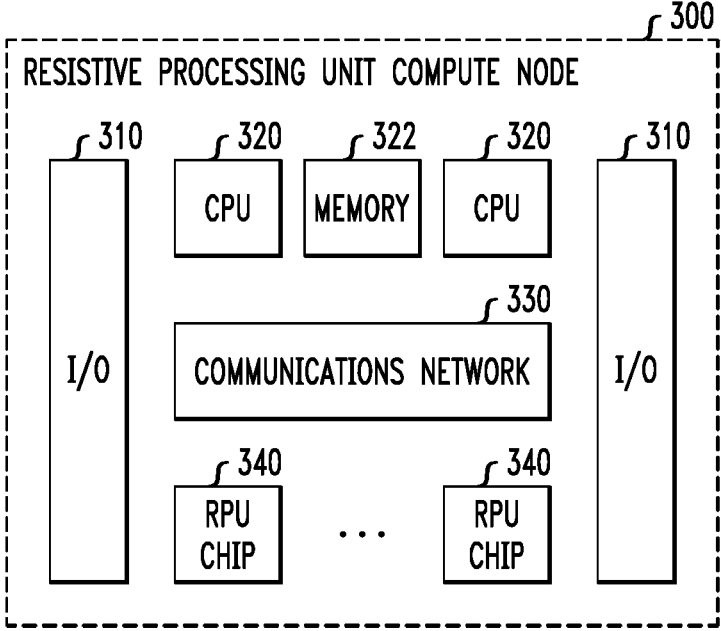
FIG. 3 schematically illustrates a resistive processing unit compute node comprising a plurality of resistive processing unit devices, which can be implemented in the system of FIG. 1, according to an exemplary embodiment of the disclosure.

FIG. 3 schematically illustrates a resistive processing unit compute node 300 comprising a plurality of resistive processing unit accelerator devices, which can be implemented in the system of FIG. 1, according to an exemplary embodiment of the disclosure. In some embodiments, one or more of the neural cores 122 of the neuromorphic computing system 120 of FIG. 1 comprises a RPU compute node 300 shown in FIG. 3. The RPU compute node 300 comprises I/O interfaces 310, one or more processors 320 (e.g., CPUs), memory 322, a communications network 330, and one or more RPU chips 340. In some embodiments, each RPU chip 340 comprises the RPU device 200 of FIG. 2.

Figure 4:
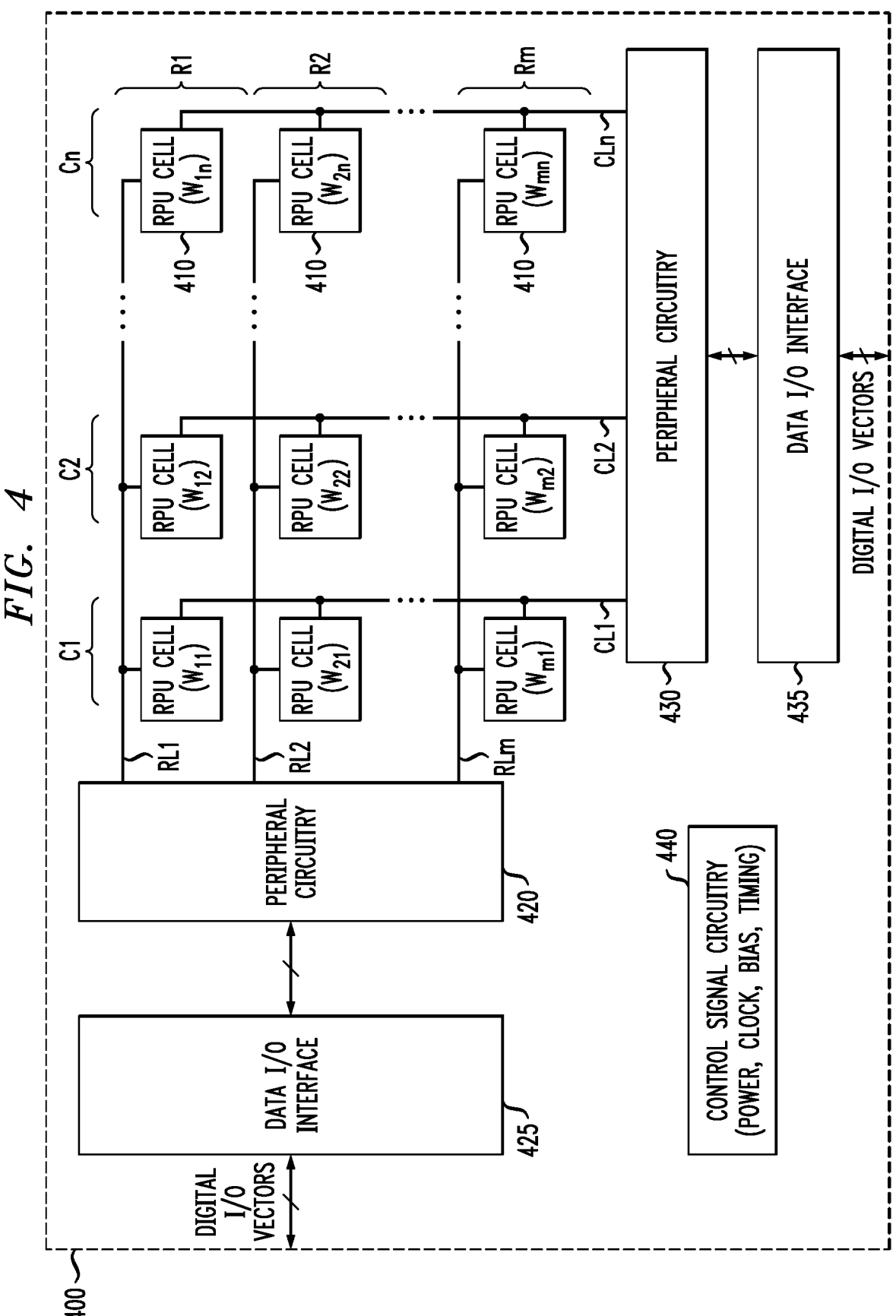
FIG. 4 schematically illustrates a resistive processing unit device having bound management circuitry which is configured with static bound management parameters for scaling digital input and output vectors, according to an exemplary embodiment of the disclosure.

FIG. 4 schematically illustrates a resistive processing unit system 400 which can be implemented in the system of FIG. 1, according to an exemplary embodiment of the disclosure. In some embodiments, FIG. 4 schematically illustrates an exemplary embodiment of the RPU tiles 240 of the RPU device 200 of FIG. 2. The RPU system 400 comprises a two-dimensional (2D) crossbar array of RPU cells 410 (alternatively referred to as RPU array) arranged in a plurality of rows R1, R2, . . . , Rm, and a plurality of columns C1, C2, . . . , Cn. The RPU cells 410 in each row R1, R2, . . . , Rm are commonly connected to respective row control lines RL1, RL2, . . . , RLm (collectively, row control lines RL). The RPU cells 410 in each column C1, C2, . . . , Cn are commonly connected to respective column control lines CL1, CL2, . . . , CLn (collectively, column control lines CL). Each RPU cell 410 is connected at (and between) a cross-point (or intersection) of a respective one of the row and column control lines. In an exemplary embodiment, the number of rows (m) and the number of columns (n) are the same (i.e., n=m). For example, in some embodiments, the RPU system 400 comprises a 4,096×4, 096 array of RPU cells 410.

The RPU system 400 further comprises peripheral circuitry 420 connected to the row control lines RL1, RL2, . . . , RLm, as well peripheral circuitry 430 connected to the column control lines CL1, CL2, . . . , CLn. Further, the peripheral circuitry 420 and 430 is coupled to bound management circuitry 425 and 435, respectively, the functions of which will be explained in further detail below. The RPU system 400 further comprises control signal circuitry 440 which, depending on the configuration of the RPU system 400, comprises various types of circuit blocks such as power, clock, bias and timing circuitry to provide power distribution and control signals and clocking signals for operation of the peripheral circuitry 420 and 430.

In some embodiments, each RPU cell 410 in the RPU system 400 comprises a resistive element with a conductance value that is tunable. For a neural network model, the RPU cells 410 in the given RPU array comprise respective conductance values that are mapped to respective synaptic weight values of a weight matrix W for a given layer of the neural network model, which is stored in the array of RPU cells 410. In some embodiments, the resistive elements of the RPU cells 410 are implemented using resistive memory devices such as resistive switching devices (interfacial or filamentary switching devices), ReRAM, memristor devices, (phase-change material (PCM) devices, etc.) and other types of devices which have a tunable conductance (or tunable resistance level) which can be programmatically adjusted within a range of a plurality of different conductance levels to tune the weight of the RPU cell 410. In some embodiments, the variable conductance elements of the RPU cells 410 can be implemented using ferroelectric devices such as ferroelectric field-effect transistor devices.

Furthermore, in some embodiments, the RPU cells 410 can be implemented using an analog CMOS-based framework in which each RPU cell 410 comprises a capacitor and a read transistor. With the analog CMOS-based framework, the capacitor serves as a memory element of the RPU cell 410 and stores a weight value in the form a capacitor voltage, and the capacitor voltage is applied to a gate terminal of the read transistor to modulate a channel resistance of the read transistor based on the level of the capacitor voltage, wherein the channel resistance of the read transistor represents the conductance of the RPU cell and is correlated to a level of a read current that is generated based on the channel resistance.

While the row control lines RL and column control lines CL are each shown in FIG. 4 as a single line for ease of illustration, it is to be understood that each row and column control line can include two or more control lines connected to the RPU cells 410 in the respective rows and columns, depending on the implementation and the specific architecture of the RPU cells 410. For example, in some embodiments, each row control line RL can include a complementary pair of word lines for a given RPU cell 410. Moreover, each column control line CL may comprise multiple control lines including, e.g., one or more source lines (SL) and one or more bit lines (BL).

The peripheral circuitry 420 and 430 comprises various circuit blocks which are connected to the respective rows and columns in the 2D array of RPU cells 410, and which are configured to perform various analog, in-memory computation operations such as matrix-vector multiplication operations, etc., to provide hardware accelerated computation operations as discussed herein. For example, in some embodiments, to support RPU cell read/sensing operations (e.g., read a weight value of a given RPU cell 410), the peripheral circuitry 420 and 430 comprises pulse-width modulation (PWM) circuitry and read pulse driver circuitry, which is configured to generate and apply PWM read pulses to the RPU cells 410 in response to digital input vector values (read input values) received during different operations. More specifically, in some embodiments, the peripheral circuitry 420 and 430 comprises digital-to-analog (D/A) converter circuitry that is configured to receive a digital input vector (to be applied to rows or columns) and convert the elements of the digital input vector into analog input vector values that are represented by input voltage voltages of varying pulse width. In some embodiments, a time-encoding scheme is used when input vectors are represented by fixed amplitude Vin=1 V pulses with a tunable duration (e.g., pulse duration is a multiple of 1 ns and is proportional to the value of the input vector). The input voltages applied to rows (or columns) generate output vector values which are represented by output currents, wherein the stored weights/values of the RPU cells 410 are essentially read out by measuring the output currents.

The peripheral circuitry 420 and 430 further comprises current integrator circuitry and analog-to-digital (A/D) converter circuitry to integrate read currents ($I_{READ}$) which are output and accumulated from the connected RPU cells 410, and to convert the integrated currents into digital values (read output values) for subsequent computation. In particular, the currents generated by the RPU cells 410 are summed on the columns or rows and the summed current is integrated over a measurement time, $T_{MEAS}$, by current readout circuitry of the peripheral circuitry 420 and 430. The current readout circuitry comprises current integrators and analog-to-digital (A/D) converters. In some embodiments, each current integrator comprises an operational amplifier that integrates the current output from a given column (or row) (or differential currents from pairs of RPU cells implementing negative and positive weights) on a capacitor, and an analog-to-digital (A/D) converter converts the integrated current (e.g., an analog value) to a digital value.

FIG. 4 illustrates an exemplary embodiment in which the RPU system 400 is configured to implement a portion of a hardware-based artificial neural network (e.g., DNN, CNN, RNN, etc.) which is trained to perform a given machine learning application such as image recognition, object recognition, speech recognition, etc. In an exemplary embodiment, the array of RPU cells 410 of the RPU system 400 of FIG. 4 comprises artificial synaptic devices which connect artificial pre-synaptic neurons (e.g., artificial neurons of an input layer or hidden layer of the artificial neural network) and artificial post-synaptic neurons (e.g., artificial neuron of a hidden layer or output layer of the artificial neural network), wherein the RPU cells 410 (artificial synaptic devices) provide synaptic weights that represent connection strengths between the pre-synaptic and post-synaptic neurons. In particular, as shown in FIG. 4, the weights $W_{ij}$ (where i denotes the row index and j denotes the column index) are in the form of a matrix. The in-memory computations associated with such neural networks include forward inference computations in which the trained neural networks are used to process input data for purposes of, e.g., classifying the input data, predicting events based on the input data, etc.

The bound management circuitry 425 and 435 is configured to apply bound parameter scaling factors to digital input and output vectors that are processed and generated by the RPU system 400 for performing matrix-vector multiplication operations for forward inference computations. As noted above, the computations (e.g., matrix-vector multiplication computations) that are performed by the RPU system 400 are analog in nature and therefore prone to various sources of noise. In addition, the computation results (e.g., matrix-vector multiplication results) comprise analog voltages and, consequently, the computation results are bounded by the signal limits imposed by the peripheral circuitry. In some embodiments, the bound management circuitry 425 and 435 is configured to implement static input and output scaling parameters that are learned (in the digital domain) and applied to the RPU system 400. The input and output scaling parameters are configured to condition the digital input/output vectors that are processed and generated by the RPU system 400 to perform inference processing using a trained artificial neural network which is implemented, in part, by the RPU system 400. For example, as explained in further detail below, a digital input vector can be scaled by a static input scaling parameter to ensure that the analog output voltages generated by the RPU array are within a target voltage range which prevents saturation at an output of an operational amplifier of a current integrator circuit.

Figure 5:
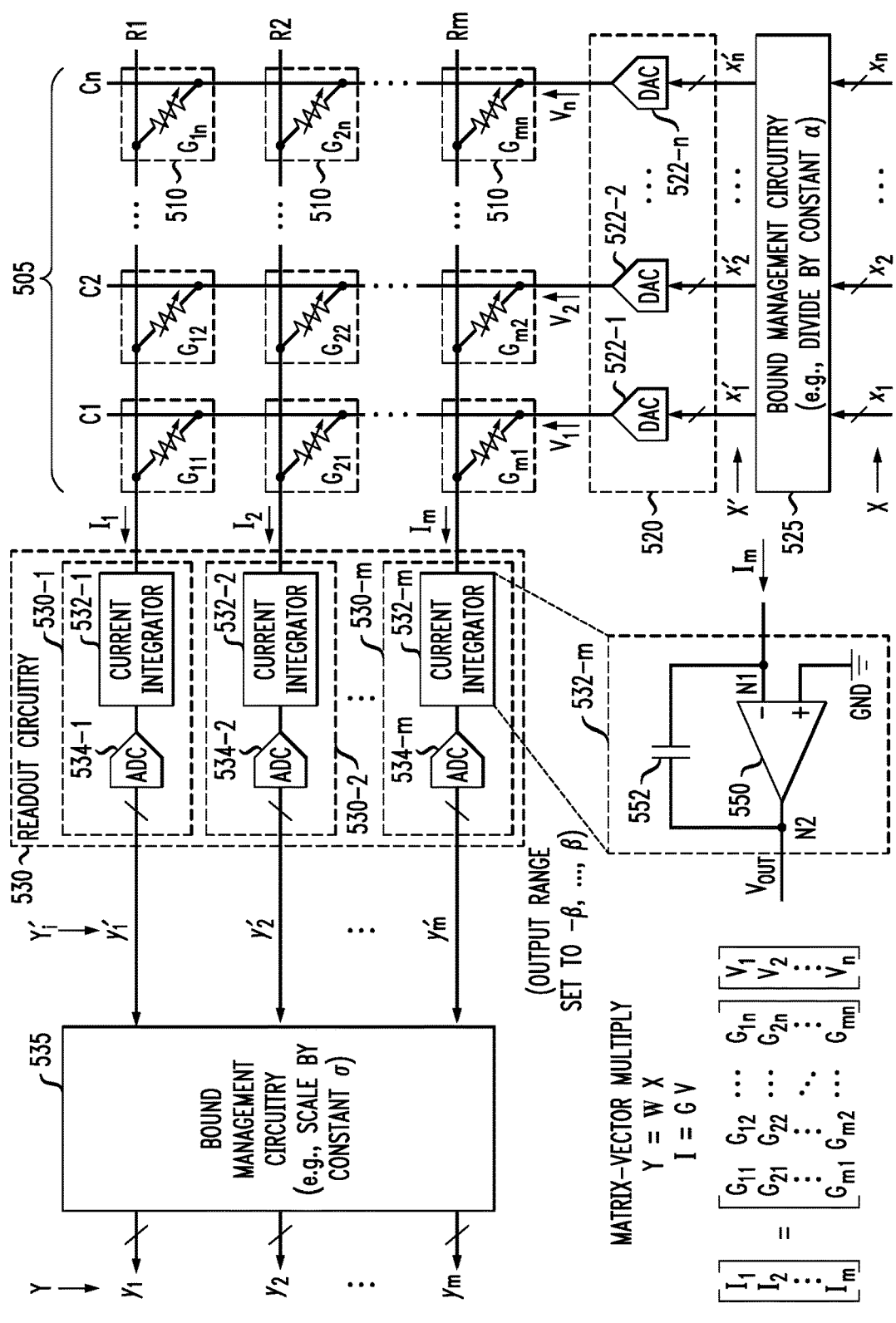
FIG. 5 schematically illustrates a method for configuring a resistive processing unit system to perform an analog matrix-vector multiplication operation on a weight matrix stored in resistive processing unit array and scaling digital input and output vectors using static bound management parameters, according to an exemplary embodiment of the disclosure.

FIG. 5 schematically illustrates a method for configuring a resistive processing unit system to perform an analog matrix-vector multiplication operation on a weight matrix stored in a resistive processing unit array and scaling digital input and output vectors using static bound management parameters, according to an exemplary embodiment of the disclosure. In some embodiments, FIG. 5 schematically illustrates an RPU system 500 which comprises the exemplary architecture of the RPU system 400 of FIG. 4, but wherein the RPU system 500 is configured to perform a matrix-vector multiplication operation for a forward inference operation using a trained artificial neural network which is implemented, in part, by the RPU system 500. A system with resistive RPU crossbar arrays is enhanced with a scalar input scale and scalar output scale (both fixed per layer per ANN).

As shown in FIG. 5, the RPU system 500 comprises a crossbar array of RPU cells 505 (or RPU array 505), wherein each RPU cell 510 in the RPU array 505 comprises an analog non-volatile resistive element (represented as a variable resistor having a tunable conductance G) at the intersection of each row (R1, R2, . . . , Rm) and column (C1, C2, . . . , Cn). The RPU array 505 comprises a matrix of conductance values Gij which are mapped to matrix values of a given matrix (e.g., weight matrix W), which are encoded by the conductance values Gij (where i represents a row index and j denotes a column index) of the respective RPU cells 510. In an exemplary embodiment, the given matrix is stored in the RPU array 505 wherein the $i^{th}$ row of RPU cells 510 represents the $i^{th}$ row of the given weight matrix, and wherein the $j^{th}$ column of RPU cells 510 represents the $j^{th}$ column of the given weight matrix.

To perform a matrix-vector multiplication operation, multiplexer circuitry in the peripheral circuitry of the RPU system 500 is configured to selectively connect line driver circuitry 520 to the column lines C1, C2, . . . , Cn. The line driver circuitry 520 comprises plurality of digital-to-analog (DAC) circuit blocks 522-1, 522-2, . . . , 522-n (collectively DAC circuit blocks 522) which are connected to respective column lines C1, C2, . . . , Cn. In addition, multiplexer circuitry in the peripheral circuitry of the computing system 500 is configured to selectively connect readout circuitry 530 to the row lines R1, R2, . . . , Rm. The readout circuitry 530 comprises a plurality of readout circuit blocks 530-1, 530-2, . . . , 530-m, which are connected to respective row lines R1, R2, . . . , Rm. The readout circuit blocks 530-1, 530-2, . . . , 530-m comprise respective current integrator circuitry 532-1, 532-2, . . . , 532-m, and respective analog-to-digital (ADC) circuitry 534-1, 534-2, . . . , 534-m.

As further schematically shown in FIG. 5 for illustrative purposes, the current integrator circuitry 532-m comprises an operational transconductance amplifier (OTA) 550, and an integrating capacitor 552. The integrating capacitor 552 is connected in a negative feedback path between input and output nodes N1 and N2 of the operational amplifier 550. The operational amplifier 550 comprises a non-inverting input connected to ground (GND) voltage, an inverting input (denoted node N1) coupled to an output of the row line $R_m$, and an output (denoted node N2) connected to an input of the ADC circuit 534-m. The integrating capacitor 552 provides negative capacitive feedback to allow the operational amplifier 550 to convert an input current (e.g., aggregate row current $I_m$) to an analog output voltage $V_{OUT}$ on the output node N2. More specifically, the current integrator circuit 532-m performs an integration operation over an integration period ($T_{MEAS}$) to convert an input current at the input node N1 of the current integrator circuit 532-m to an analog voltage $V_{OUT}$ at the output node N2 of the current integrator circuit 532-m. At the end of an integration period, the ADC circuit 534-m latches in the output voltage $V_{OUT}$ generated at the output node N2, and quantizes the output voltage $V_{OUT}$ to generate a digital output signal. It is to be noted that each block of the current integrator circuitry shown in FIG. 5 implements the same framework shown for the current integrator circuitry 532-m.

As further shown in FIG. 5, the RPU system 500 comprises bound management circuitry 525 and 535 which is configured to apply static input and output scaling parameters to digital input and output vectors. In particular, the bound management circuitry 525 is configured to apply a static input scaling parameter $\alpha$ to a digital input vector $X=[x_1, x_2, . . . , x_n]$, and output a scaled digital input vector $X'=[x'_1, x'_2, . . . , x'_n]$ to the line driver circuitry 520. More specifically, in an exemplary embodiment, the bound management circuitry 525 is configured to divide the values of the digital input vector $X=[x_1, x_2, . . . , x_n]$ by the value of the static scaling parameter $\alpha$ to generate the scaled digital input vector $X'=[x'_1, c'_2, . . . , x'_n]$. The scaled digital input vector $X'=[x'_1, x'_2, \ldots, x'_n]$ is converted to an analog voltage vector $V=[V_1, V_2, \ldots, V_n]$. In this regard, the input vector in analog space is given by:

$$V = f_{DAC}\left(\frac{1}{\alpha}X\right),$$

where $f_{DAC}$ denotes the DAC transformation by the line driver circuitry 520, and where $\alpha$ denotes the static input scaling parameter (or, more generally, bound management parameter).

Furthermore, the bound management circuitry 535 is configured to apply a static scaling parameter $\sigma$ to a digital output vector $Y'=[y'_1, y'_2 \ldots, y'_n]$ to generate a resulting digital output vector $Y=[y_1, y_2, \ldots, y_m]$. The digital output vector $Y'=[y'_1, y'_2 \ldots, y'_n]$ represents a result of a matrix-vector multiplication operation performed by the RPU system 500 based on the scaled digital input vector $X'=[x'_1, x'_2, \ldots, x'_n]$ and the weight matrix W encoded by the conductance values G of the array of RPU cells 510, i.e., $Y'=WX'$. The bound management circuitry 535 is configured to multiply the values of the digital output vector $Y'=[y'_1, y'_2 \ldots, y'_n]$ by the static scaling parameter $\sigma$ to generate the resulting digital output vector $Y=[y_1, y_2, \ldots, y_m]$. In this regard, the resulting output vector in digital space is given by: $Y=\sigma f_{ADC}(Y')$, where $f_{ADC}$ denotes the ADC transformation performed by ADC blocks of the readout circuitry 530, and where $\sigma$ denotes the static output scaling parameter (or, more generally, bound management parameter). In some embodiments, the output scaling parameter is a function of the static input scaling parameter, e.g., $$\sigma = \left(\alpha\frac{\gamma}{\gamma_o}\right),$$

wherein the parameters $\alpha$ and $\gamma$ are learning by performing a hardware-aware training process, as described in further detail below in conjunction with FIG. 9.

In accordance with exemplary embodiments of the disclosure, the static input and output scaling parameters, which are applied by the bound management circuitry 525 and 535, are learned using a hardware-aware training process that is implemented in the digital domain. The hardware-aware training process is performed to learn optimal static input and output parameters for each layer of an artificial neural network which is implemented by the RPU system. The exemplary embodiment discussed herein are configured to provide static input and output range management for forward pass operations that are performed for classification/inference processing using a trained artificial neural network which is implemented in RPU hardware. As explained in further detail below, exemplary static input and output management methods are configured to utilize a stochastic gradient descent process to optimize the static input ranges in the digital domain by performing a hardware-aware training for a given artificial neural network in the digital domain before programming/configuring the RPU arrays and bound management circuitry (for each layer of the trained artificial neural network) with the learned weight matrices and static input/output scaling parameters for classification/inference process.

The compute results of matrix-vector multiplication operations include analog voltages (which are output from the ADC circuit blocks 534) and, therefore, the results are bounded by signal limits imposed by the readout circuitry 530 (signal bound). In particular, in the exemplary embodiment shown in FIG. 5, the readout circuitry 530 is bounded in a given signal range, $-\beta, \ldots, \beta$, as a result of (i) a saturation voltage of the operational amplifiers 550 of the current integrator circuit block 532 of the readout circuitry 530 (wherein a gain of the current integrator 532 is based on the size of the integration capacitor 552), and/or (ii) the ADC resolution and/or gain of the ADC circuit blocks 534 of the readout circuitry 530. In this regard, the value of the static input scaling parameter that is applied by the bound management circuitry 525 to the digital input vectors X that are input to the given RPU system 500 (configured for a given layer of the trained artificial neural network) is a value that is learned to maintain the results of matrix-vector multiplication operations within the bounded range, $-\beta, \ldots, \beta$. Scaling down the values of the digital input signals according to the learned input scaling parameter can prevent saturation of the readout circuitry for forward pass operations by ensuring that matrix-vector compute results of the RPU system are within the range of an acceptable voltage swing, thus overcoming the bound problem.

In some RPU configurations, the bound management circuitry implements dynamic schemes in which the input and output scaling parameter are computed, during runtime, based on, e.g., maximum values of the digital input vectors. These schemes are typically used in instances where the analog RPU system is actually utilized to perform analog computations that are needed for training an artificial neural network. However, such dynamic schemes for noise and bound management require addition digital and/or analog compute operation during training or inference process. As such, the throughput of the RPU system is reduced as a result of the additional computations needed to dynamically determine the input/output scaling parameters. For DNN inference operations, where only forward pass operations are performed on the analog crossbar array, the processing throughput is enhanced by using static input/output scaling parameters which are learned for each layer of the neural network model, as no pass through the input vector (e.g., dynamically computing the input scaling parameter based on a maximum value of the input vector) needs to be done. For analog training operations using an RPU system, a dynamic noise and boundary management scheme is more important during backward pass operations in which small error signals are backpropagated through the network during the training process, wherein the input/output scaling factors for a given RPU array will vary depending on whether the RPU array is performing a forward pass or backward pass operation. However, backward pass operations on an RPU array are not performed for DNN inference/classification operations.

In the exemplary configuration of FIG. 5, assuming a given matrix W is stored in the RPU array 505 such that the $i^{th}$ row of RPU cells represents the $i^{th}$ row of the stored matrix W, and the $j^{th}$ column of RPU cells represents the $j^{th}$ column of the stored matrix W, a matrix-vector multiplication process $Y'=WX'$, is performed by inputting a digital vector $X=[x_1, x_2, \ldots, x_n]$ to the bound management circuitry 525, wherein the bound management circuitry 525 divides the values $[x_1, x_2, \ldots, x_n]$ of the digital vector X to output a scaled input vector $X'=[x'_1, x'_2 \ldots, x'_n]$ to the column lines of the RPU array 505. The scaled digital signals $x'_1, x'_2 \ldots, x'_n$ are input to respective DAC circuit blocks 522-1, 522-2, $\ldots$, 522-$n$ which generate analog voltages $V_1, V_2, \ldots, V_n$ at the input to the respective column lines C1, C2, $\ldots$, Cn, which are proportional to the input vector values x'$_1$, x'$_2$. . . , x'$_n$, respectively. In some embodiments, the DAC circuit blocks 522-1, 522-2, . . . , 522-$n$ each comprise pulse-width modulation circuitry and driver circuitry which is configured to generate pulse-width modulated (PWM) read pulses V$_1$, V$_2$, . . . , V$_n$ that are applied to the respective column lines C1, C2, . . . , Cn.

More specifically, in some embodiments, as noted above, the DAC circuit blocks 522-1, 522-2, . . . , 522-$n$ are configured to perform a digital-to-analog conversion process using a time-encoding scheme where the elements x'$_1$, x'$_2$ . . . , x'$_n$ of the scaled input vector X' are represented by fixed amplitude pulses (e.g., V=1V) with a tunable duration, wherein the pulse duration is a multiple of a prespecified time period (e.g., 1 nanosecond) and is proportional to the value of the elements x'$_1$, x'$_2$ . . . , x'$_n$ of the scaled input vector X'. For example, a given digital input value of 0.5 can be represented by a voltage pulse of 4 ns, while a digital input value of 1 can be represented by a voltage pulse of 80 ns (e.g., a digital input value of 1 can be encoded to an analog voltage pulse with a pulse duration that is equal to the integration time T$_{meas}$).

Figure 6:
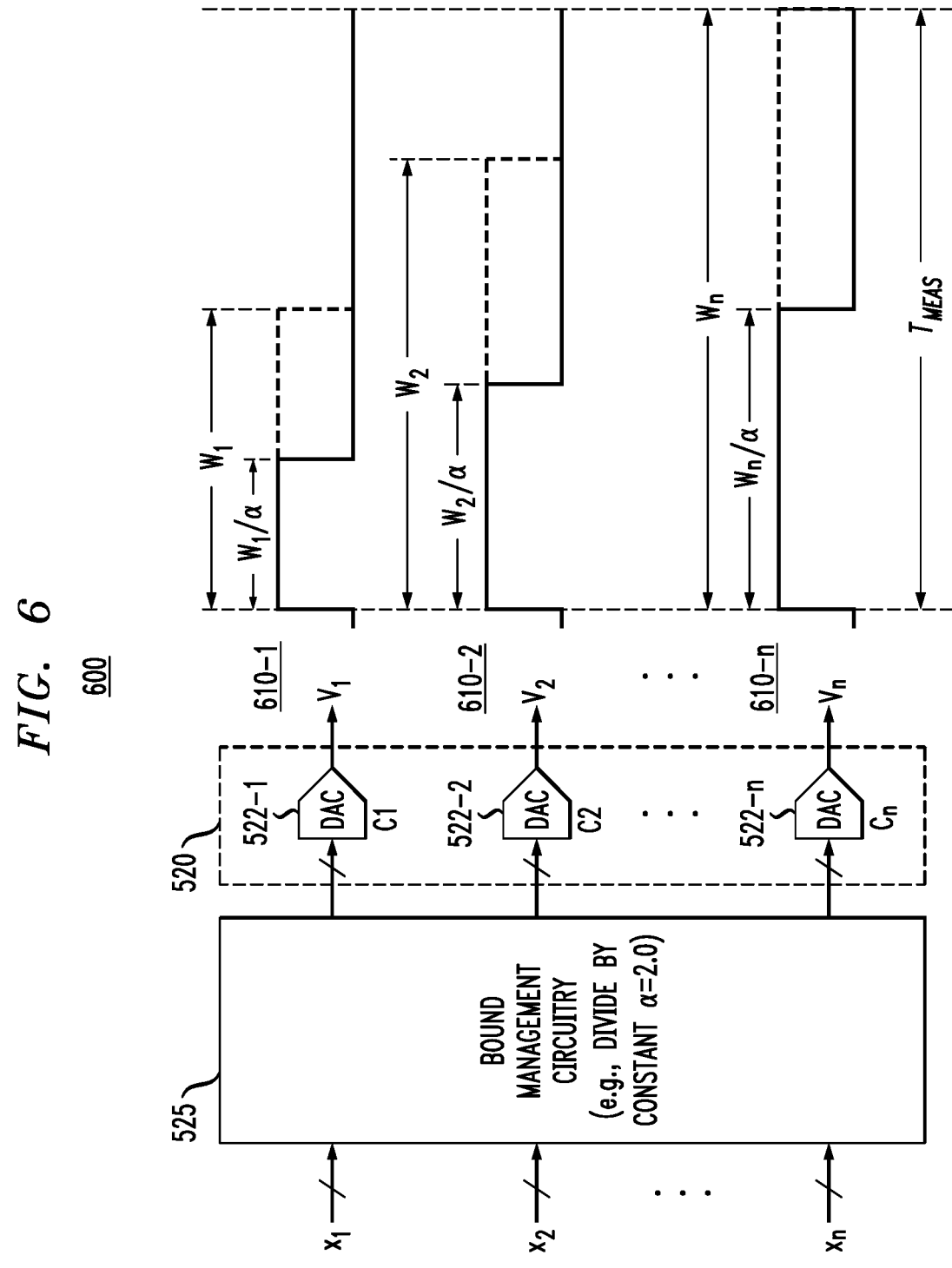
FIG. 6 schematically illustrates a method for scaling a digital input vector using static bound management parameters, according to an exemplary embodiment of the disclosure.

FIG. 6 schematically illustrates a method for scaling a digital input vector using static bound management parameters, according to an exemplary embodiment of the disclosure. In particular, FIG. 6 schematically illustrates a process for decreasing pulse durations of analog voltage signals 610-1, 610-2, . . . , 610-$n$ (or V1, V2, . . . , Vn) for a given integration time T$_{MEAS}$ of the readout circuitry, which are generated by the DAC circuit blocks and applied to the respective columns C1, C2, . . . , Cn during a forward pass operation. For illustrative purposes, it is assumed that the input scaling parameter α is set equal to 2.0, and that the digital input vector X=[x$_1$, x$_2$, . . . , x$_n$] has values of x$_1$=0.5, x$_2$=0.8, . . . , x$_n$=1.0. Without applying the input scaling parameter to the digital input vector X, the analog voltage signals 610-1, 610-2, . . . , 610-$n$ (V1, V2, . . . , Vn) would have respective pulse widths of W$_1$, W$_2$, . . . , W$_n$, as shown by the dashed lines in FIG. 6.

However, the bound management circuitry 525 divides the values of the digital input vector X by 2.0 to generate a scaled digital input vector scaled input vector X' with values of x'$_1$=0.25, x'$_2$=0.4 . . . , x'$_n$=0.5. In this regard, the analog voltage signals 610-1, 610-2, . . . , 610-$n$ (V1, V2, . . . , Vn), which are generated for the forward pass operation, will have respective pulse durations of W$_1$/α, W$_2$/α, . . . , W$_n$/α, as shown by the solid lines in FIG. 6. The pulse durations W$_1$/α, W$_2$/α, . . . , W$_n$/α of the analog voltage signals 610-1, 610-2, . . . , 610-$n$ (V1, V2, . . . , Vn) are ½ the pulse durations W$_1$, W$_2$, . . . , W$_n$ of the analog voltage signals 610-1, 610-2, . . . , 610-$n$ (V1, V2, . . . , Vn) that would be generated without the input vector scaling. This scheme provides for decreased output voltages V$_{OUT}$ generated by the current integrators of the readout circuitry to thereby maintain the compute results within the signal bounds of the readout circuitry, which is optimal for the forward pass operation.

Referring back to FIG. 5, to perform a matrix-vector multiplication, the analog input voltages V$_1$, V$_2$, . . . , V$_n$ (e.g., pulses), are applied to the column lines C1, C2, . . . , Cn, wherein each RPU cell 510 generates a corresponding read current I$_{READ}$=V$_j$×G$_{ij}$ (based on Ohm's law), wherein V$_j$ denotes the analog input voltage applied to the given RPU cell 510 on the given column j and wherein Gij denotes the conductance value of the given RPU cell 510 (at the given row i and column j). As shown in FIG. 5, the read currents that are generated by the RPU cells 510 on each row i are summed together (based on Kirchhoff's current law) to generate respective currents I$_1$, I$_2$, . . . , I$_m$ at the output of the respective rows R1, R2, . . . , Rm. In this manner, the resulting row currents I$_1$, I$_2$, . . . , I$_m$ represent the result of a matrix-vector multiplication operation that is performed, wherein the matrix W (which is represented by the conductance matrix G of conductance values Gij) is multiplied by the input analog voltage vector [V$_1$, V$_2$, . . . , V$_n$] to generate and output an analog current vector [I$_1$, I$_2$, . . . , I$_m$], as illustrated in FIG. 5. In particular, a given row current I$_i$ is computed as I$_i$=Σ$_{j=1}^n$V$_j$G$_{ij}$. For example, the row current I$_1$ for the first row R1 is determined as I$_1$=(V$_1$G$_{11}$+ V$_2$G$_{12}$+, . . . +V$_n$G$_{1n}$).

The resulting aggregate read currents I$_1$, I$_2$, . . . , I$_m$ at the output of the respective rows R1, R2, . . . , Rm are input to respective readout circuit blocks 530-1, 530-2, . . . , 530-$m$ of the readout circuitry 530. The aggregate read currents I$_1$, I$_2$, . . . , I$_m$ are integrated by the respective current integrator circuits 532-1, 532-2, . . . , 532-$m$ to generate respective output voltages, which are quantized by the respective ADC circuits 534-1, 534-2, . . . , 534-$m$ to generate a resulting digital output vector Y'=[y'$_1$, y'$_2$ . . . , y'$_n$], which represents the result of the matrix-vector multiplication operation Y'=WX'. As noted above, the bound management circuitry 535 multiplies the values of the digital output vector Y'=[y'$_1$, y'$_2$ . . . , y'$_n$] by the static scaling parameter σ to generate the resulting digital output vector Y=[y$_1$, y$_2$, . . . , y$_m$].

The exemplary embodiment of FIG. 5 schematically illustrates a process for performing a matrix-vector multiplication operation Y'=WX'wherein (i) the matrix W is stored in the RPU array 505 such that the i$^{th}$ row of RPU cells represents the i$^{th}$ row of the matrix W, and the j$^{th}$ column of RPU cells represents the j$^{th}$ column of the matrix W, (ii) the input vector X is input to the columns, and (iii) the resulting output vector Y is generated at the output of the rows. In other embodiments, the same matrix-vector multiplication operation can be performed by (i) storing a transpose matrix W$^T$ of the matrix W in the RPU array 505 such that the i$^{th}$ row of the matrix W is stored in the RPU array 505 as the j$^{th}$ column of the transpose matrix W$^T$, (ii) applying the input vector X to the rows, and (iii) reading the resulting output vector Y$_i$ at the output of the columns.

Figures 7A, 7B:
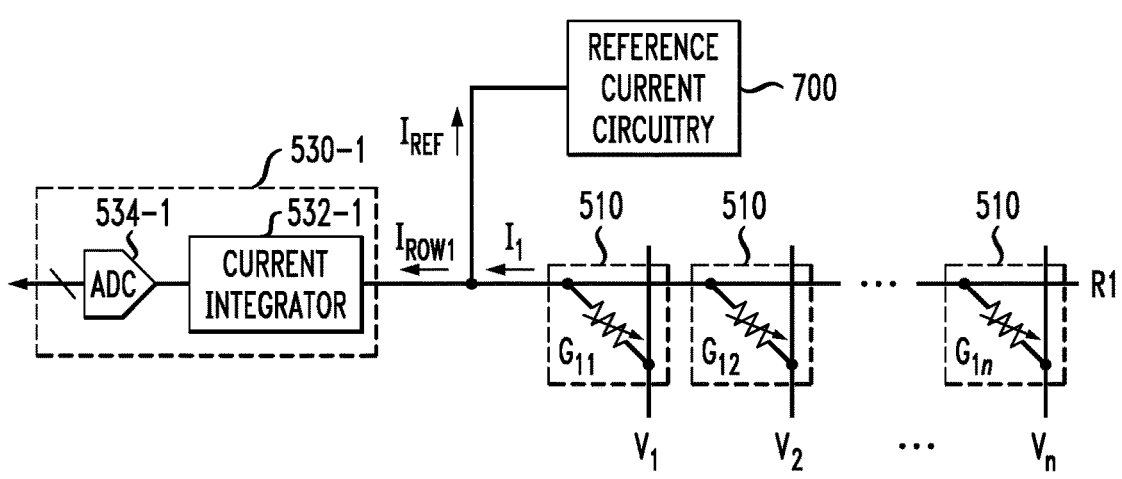
FIG. 7A schematically illustrates a method for configuring a resistive processing unit system to perform an analog matrix-vector multiplication operation on a weight matrix stored in a resistive processing array using signed matrix values, according to an exemplary embodiment of the disclosure.
FIG. 7B schematically illustrates a method for configuring a resistive processing unit system to perform an analog matrix-vector multiplication operation on a weight matrix stored in a resistive processing unit array using signed matrix values, according to another exemplary embodiment of the disclosure.

While FIG. 5 schematically illustrates an exemplary method performing a matrix-vector multiplication operation using a single RPU array, other techniques can be implemented to perform a matrix-vector multiplication operation using "signed weights." For example, FIGS. 7A and 7B schematically illustrate methods for configuring an RPU system comprising an RPU array to perform an analog matrix-vector multiplication operation on a weight matrix stored in the RPU array using signed weight values, according to alternate exemplary embodiments of the disclosure. For illustrative purposes, the exemplary embodiments of FIGS. 7A and 7B will be discussed in the context of extending the RPU system 500 of FIG. 5 to enable the use of signed weights.

More specifically, FIG. 7A schematically illustrates a method for generating a row current during a matrix-vector multiplication operation using a reference current (I$_{REF}$) that is generated by a reference current circuit 700 to enable "signed weights." For ease of illustration, FIG. 7A shows only the first row R1 and the associated readout circuit block 530-1 the RPU system 500 of FIG. 5. FIG. 7A schematically illustrates a differential read scheme in which a row current Irow$_1$ that is input to the readout circuit block 530-1 is determined as I$_{ROW1}$=I$_1$−I$_{REF}$. With this differential scheme, the row current I$_{ROW1}$ will have (i) a magnitude (which corresponds to an aggregate current or an individual weight value) and (ii) a sign (+, −, 0). The sign of the row current $I_{ROW1}$ will depend on the whether $I_1$ is greater than, equal to, or less than, the reference current $I_{REF}$. A positive sign ($I_{ROW1} > 0$) will be obtained when $I_1 > I_{REF}$. A zero value ($I_{ROW1} = 0$) will be obtained when $I_1 = I_{REF}$. A negative sign ($I_{ROW1} < 0$) will be obtained when $I_1 < I_{REF}$. While the reference current circuitry 700 is generically illustrated in FIG. 7A, the reference current circuitry 700 can be implemented using known techniques. For example, in some embodiments, the reference current circuitry 700 comprises a fixed current source which is configured to generate a reference current $I_{REF}$ with a known fixed magnitude that is selected for the given application.

Next, FIG. 7B schematically illustrates a method for generating a row current $I_{ROW1}$ using different row currents $I_1^+$ and $I_1^-$ from corresponding rows R1$^+$ and R1$^-$ of two separate RPU arrays 710-1 and 710-2, wherein the conductance is determined as (G$^+$-G$^-$). More specifically, FIG. 7B schematically illustrates a differential read scheme in which the row current $I_{ROW1}$ that is input to the readout circuit block 530-1 is determined as $I_{ROW1} = I_1^+ - I_1^-$. As shown in FIG. 7B, each RPU cell 510 comprises two unit RPU cells 510-1 and 510-2 from two separate RPU arrays 710-1 and 710-2, respectively. With this differential scheme, the row current $I_{ROW1}$ will have a magnitude and sign, wherein the sign of the row current $I_{ROW1}$ will depend on the whether $I_1$ is greater than, equal to, or less than, $I_1^-$. A positive sign ($I_{ROW1} > 0$) will be obtained when $I_1 > I_1^-$. A zero value ($I_{ROW1} = 0$) will be obtained when $I_1 = I_1^-$. A negative sign ($I_{ROW1} < 0$) will be obtained when $I_1 < I_1^-$.

More specifically, in the exemplary embodiment of FIG. 7B, as noted above, each RPU cell 510 comprises two unit RPU cells 510-1 and 510-2 which have respective conductance values $G_{ij}^+$ and $G_{ij}^-$, wherein the conductance value of a given RPU cell 510 is determined as the difference between the respective conductance values, i.e., $G_{ij} = G_{ij}^+ - G_{ij}^-$ where i and j are indices within the RPU arrays 710-1 and 710-2. In this way, negative and positive weights can be readily encoded using positive-only conductance values. In other words, since the conductance values of the resistive devices of the RPU cells can only be positive, the differential scheme in FIG. 7B implements a pair of identical RPU arrays to encode positive ($G_{ij}^+$) and negative ($G_{ij}^-$) matrix values, wherein the matrix value ($G_{ij}$) of a given RPU cell is proportional to a difference of two conductance values stored in two corresponding devices ($G_{ij}^+ - G_{ij}^-$) located in identical positions of the pair of RPU arrays 710-1 and 710-2. In some embodiments, the two RPU arrays 710-1 and 710-2 can be stacked on top of each other in a back-end-of-line metallization structure of a chip. In this instance, a single RPU tile is deemed a pair of RPU arrays with the peripheral circuitry that support the operations of the singe RPU tile.

A shown in FIG. 7B, positive voltage pulses (V$_1$, V$_2$, . . . , V$_n$) and corresponding negative voltage pulses (−V$_1$, −V$_2$, . . . , −V$_n$) are supplied separately to the RPU cells 510-1 and 510-2 in corresponding rows in the identical RPU arrays 710-1 and 710-2 that are used to encode positive and negative matrix values. The row currents $I_1^+$ and $I_1^-$ that are output from the corresponding first rows R1$^+$ and R1$^-$ in the respective RPU arrays 710-1 and 710-2 are combined to generate a differential current $I_{ROW1}$ which is input to the readout circuit block 530-1 connected to the corresponding first rows R1$^+$ and R1$^-$.

In some embodiments where complex matrices are implemented (e.g., a complex matrix which comprises a real part and an imaginary part), the RPU framework of FIG. 7B can be implemented to store real and imaginary matrix values in two distinct RPU arrays. For example, in the exemplary embodiment of FIG. 7B, the first RPU array 710-1 can be configured to store the real matrix values of a complex matrix, while the corresponding second RPU array 710-2 is configured to store the imaginary matrix values of the complect matrix. In this manner, the respective parts can then be processed separately, making it possible to obtain a conjugate transpose A* and a pseudoinverse A$^\dagger$. In other embodiments, each RPU cell 510 in FIG. 7B can be implemented using two adjacent unit cells 510-1 and 510-2 on the same RPU array. For example, in FIG. 7B, the rows implemented R1$^+$ and R1$^-$ can be two adjacent rows of the same RPU array (e.g., same RPU tile). In such configuration, the control lines of the RPU array would be configured to support such RPU cell configuration, as is understood by those of ordinary skill in the art.

FIG. 8 illustrates a flow diagram of a method for configuring a resistive processing unit system to implement a trained artificial neural network and learned bound management parameters for inference processing, according to an exemplary embodiment of the disclosure. In some embodiments, the process flow of FIG. 8 illustrates exemplary modes of operation of the digital processing system 110 of FIG. 1 when executing the various processes 130, 132, 134, and 136. An initial step involves performing a model training process in the digital domain (e.g., via process 130, FIG. 1) to train an artificial neural network model for a given application (block 800). The artificial neural network can be any type of neural network (e.g., DNN, CNN, RNN, etc.) which is suitable for a target application (e.g., image recognition, object recognition, speech recognition, etc.). In addition, any suitable mathematical method can be implemented to train the artificial neural network in the digital domain. Such training methods include gradient-based methods such as stochastic gradient descent (SGD).

In particular, a deep learning model can be trained using an SGD process in which error gradients with respect to model parameters of a given deep learning model are calculated using multiple iterations of a backpropagation process. A backpropagation comprises a sequence of three cycles including (i) a forward process, (ii) a backward process, and (iii) a weight update process, wherein the backpropagation process is repeated for many iterations until a convergence criterion is met. For each iteration backpropagation process, a mini-batch of training data is input to the artificial neural network model, and a forward propagation process is performed to process the mini-batch of data, layer by layer, of the artificial neural network model. As data moves forward through the network, matrix-vector multiplication computations are performed, wherein hidden layers of neurons receive the data inputs, perform a non-linear transformation, and then send the results to a next weight matrix. This process continues until the data reaches the output layer of neurons.

The output layer of neurons evaluates a classification error, and then propagates the classification error back through the neural network in a manner similar to the forward pass, which results in a matrix-vector multiplication computations being performed in the opposite direction. In particular, once the information reaches the final output layer of the deep learning model, an error signal is calculated and back propagated through the layers of the deep learning model using a backward process which involves minimizing an objective function by calculating error gradients with respect to model parameters (e.g., weights) and the input data. The error backpropagation process is configured to compute gradients of the loss with respect to the deep learning model parameters. In this regard, with backpropagation, the error between the actual response and the predicted response is minimized. For each mini-batch of data, when the forward pass and backward pass are completed, a weight update is performed. Essentially, each weight will be updated proportionally to the input to that weight as defined by the input neuron and the error computed by the neuron to which it is connected.

Once the initial artificial neural network model is trained in the digital domain, a next step involves performing a hardware-aware training process in the digital domain (e.g., via process 132, FIG. 1) using the trained artificial neural network model (as the initial model) to learn bound management parameters (block 801). More specifically, the hardware-aware training process is performed to learn static input and output scaling parameters for each layer of the artificial neural network model. The hardware-aware training process results in a newly trained artificial neural network with modified weight parameters for the synaptic connections between neurons of different layers of the trained artificial neural network model, as well as learned static input/output scaling parameters for each layer of the trained artificial neural network. An exemplary hardware-aware training process will be discussed in further detail below in conjunction with FIG. 9.

A next phase of the process involves configuring an RPU system to implement the trained artificial neural network using RPU hardware (block 802). As noted above, in some embodiments, the configuration process is performed by the hardware artificial neural network configuration process 134, FIG. 1 by configuring the neural cores (e.g., RPU chips) of an RPU-based neuromorphic computing system to implement a hardware-based artificial neural network which corresponds to digital artificial neural network that is trained in the digital domain by the artificial neural network training process 130 and the bound management parameter training process 132. In some embodiments, the digital processing system 110 communicates with a programming interface of the neuromorphic computing system 120 to configure one or more artificial neurons and a routing system of the neuromorphic computing system 120 to implement the trained artificial neural network in RPU hardware.

Depending on the number and/or size of the layers and weight matrices of the trained artificial neural network model, the RPU system hardware can be configured using one or more RPU chips (FIG. 2) or one or more RPU compute nodes (FIG. 3). For example, multiple RPU tiles of a given RPU chip can be configured together through physical connections, such as cabling, and under the control of firmware, to implement the trained artificial neural network wherein on-chip network routers perform communications among the individual RPU tiles. For relatively large artificial neural networks (e.g., 10 or more layers), an RPU compute node (FIG. 3) with multiple RPU chips can be configured to implement the trained artificial neural network in RPU hardware.

The number of RPU arrays that are allocated and interconnected to configure the artificial synapses of the trained artificial neural network will vary depending on the number and sizes of the synaptic weight matrices that are needed for implementing the trained artificial neural network in the RPU hardware, as well as the size of the RPU arrays. For example, each RPU tile comprises an RPU array of size of 4096×4096, then one RPU array can be configured to store the values of a given m×n weight matrix W, where m and n are 4096 or less. In some embodiments, when the given m×n weight matrix W is smaller than the physical RPU on which the given m×n weight matrix W is stored, any unused RPU cells can be set to zero and/or unused inputs to the RPU array can be padded by "zero" voltages. In some embodiments, when the size of the given m×n weight matrix W is greater than the size of a single RPU array, then multiple RPU arrays (of multiple RPU tiles) can be operatively interconnected to form an RPU array which is large enough to store the values of the given m×n weight matrix W.

Once the RPU system is configured to implement the architecture of the trained artificial neural network mode, the configuration process continues by performing a weight programming process to program the weight values of the RPU arrays of the RPU system based on the learned weight values of the trained artificial neural network model (block 803). More specifically, the weight programming process involves programming the RPU arrays with conductance values of the RPU cells, which correspond to the trained weight values of the weight matrices to thereby implement the artificial synaptic arrays (or synaptic weight matrices) that connect the different layers of the artificial neural network model. In addition, the configuration process further involves configuring the bound management circuitry of the RPU system to implement the learned bound parameters (e.g., static input/output scaling parameters) for each layer of the artificial neural network model (block 804).

Once the RPU system is configured, the RPU system can be utilized to perform an inference/classification processing using the trained artificial neural network implemented on the RPU system (block 805). As noted above, the inference/classification process involves processing input data in a forward pass operation through the layers of the artificial neural network. By implementing static input/output scaling parameters, the inference/classification process operations perform static input and output scaling for the forward pass operations through the analog RPU crossbar arrays, which provides reduced run time and digital compute cost as well as reduced hardware design complexity, in comparison to other bound management schemes in which the input/output scaling factors for each layer are determined dynamically during runtime, per forward cycle, based on the values of the digital input vectors (e.g., by determining a maximum value of the digital input vector and dynamically determining input/output scaling parameters based on the determined maximum value of the digital input vector).

Figure 9:
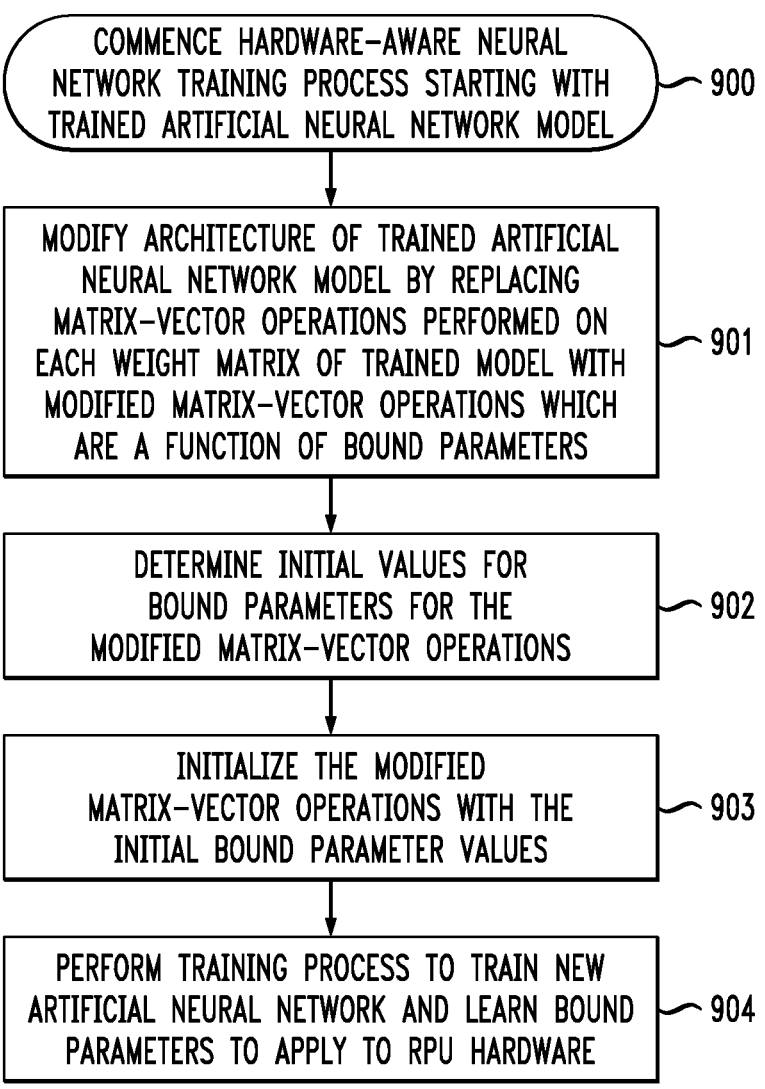
FIG. 9 illustrates a flow diagram of a method for learning bound management parameters for inference processing using a trained artificial neural network implemented on a resistive processing unit system, according to an exemplary embodiment of the disclosure.

FIG. 9 illustrates a flow diagram of a method for learning bound management parameters for inference processing using a trained artificial neural network implemented on a resistive processing unit system, according to an exemplary embodiment of the disclosure. In some embodiments, FIG. 9 illustrates a process for implementing the hardware-aware training process (block 801) of FIG. 8. As noted above, in some embodiments, the hardware-aware training process is performed in the digital domain (e.g., via the digital processing system 110, FIG. 1) using the trained artificial neural network model as the initial model to learn bound management parameters (e.g., static input and output scaling parameters) for each layer of the artificial neural network model. Referring to FIG. 9, the digital processing system 110 commences a hardware-aware training neural network training process starting with the initial trained artificial neural network model (block 900). The hardware-aware training neural network training process is configured to train a new artificial neural network model starting with the architecture of the initial trained artificial neural network model, e.g., starting with the learned weight matrices of the initial trained model.

The architecture of the initial trained artificial neural network model is then modified by replacing the matrix-vector compute operations (Y=WX) performed on each weight matrix (e.g., synapse array) of the initial trained model with modified matrix-vector compute operations which are a function of bound parameters (block 901). For example, in some embodiments, the modified matrix-vector compute operations (for each layer) are denoted by:

$$Y = \left(\alpha \frac{\gamma}{\gamma_o}\right) \text{clip} \left(W \text{ clip} \left(\frac{X}{\alpha}, -1, 1\right), -\beta, \beta\right),$$

where X denotes a digital input vector, where Y denotes a result (output vector) of the modified matrix-vector compute operation, where a denotes an input scaling parameter, where $$\left(\alpha \frac{\gamma}{\gamma_o}\right)$$

denotes an output scaling parameter σ, and where −β, β denotes a bounded signal range of the readout circuitry. The term "clip" denotes a clipping function wherein each value of a scaled input vector $$\frac{X}{\alpha},$$

which is less than −1 or greater than 1, is clipped to a value of −1 or 1, respectively, and wherein each computation of $$W\left(\frac{X}{\alpha}\right),$$

which is less than −β or greater than β, is clipped to a value of −β or β respectively.

The process continues by determining initial values for the bound parameters of the modified matrix-vector compute operations (block 902). For example, in some embodiments, the input scaling parameter α is initialized to a value of α=1. In some embodiments, the input scaling parameter α is initialized to a maximum value of value of an input vector X averaged over each input for a small number of mini-batches of data. Furthermore, in some embodiments, the bound parameter β is set based on the actual RPU hardware design. In some embodiments, the bound parameter β is set to a maximum average value of WX using a floating-point DNN value from the initial training process. In some embodiments, the bound parameters −β, β are fixed through the hardware-aware training process. In some embodiments, where the RPU hardware is configurable (e.g., ADC gain setting is adjustable), and the output signal bounds −β, β are configurable, the bound parameter β in the modified matrix-vector compute operation is a free parameter that can be learned (optimized) by the hardware-aware training process. Furthermore, in some embodiments, the parameter $\gamma_o$ is set equal to β and remains fixed for the hardware-aware training process, and the parameter γ is set equal to $$\gamma = \frac{1}{\gamma_o}.$$

The modified matrix-vector operations for each layer of the initial trained artificial neural network model are initialized with the determined bound parameter values (block 903), and the process proceed to perform the hardware-aware training process (in the digital domain) to train a new artificial neural network model with learned bound parameters to apply to the RPU hardware (block 904). In some embodiments, the hardware-aware training proceeds to learn the scalar parameters α and γ (and optionally β) for each layer of the neural network model, as well as updated weight matrices. Essentially, the hardware-aware training process is performed to retrain the artificial neural network model to take into consideration the dynamic range constraints of the RPU hardware for each layer of the artificial neural network model and to update the initial learned weight values of the weight matrices to thereby optimize the model based on the dynamic range constrains of the RPU hardware that will be configured to implement the final trained artificial neural network model.

In some embodiments, the hardware-aware training process (block 904) is performed using an SGD process and using the same training data set used to train the initial artificial neural network model. During the training process, for each iteration of the backpropagation process, the values of the free parameters (e.g., scalar parameters α and γ (and optionally β)) for each layer of the neural network model are updated according to the computed errors, gradients, and partial derivates of Y with respect to each variable parameter. For example, the scalar parameter α is updated after each iteration based on a partial derivative of Y with respect to α, i.e., $$\frac{\partial Y}{\partial \alpha}.$$

The free parameters (e.g., scalar parameters α and γ (and optionally β)) updated for each mini-batch of data according to the backpropagated gradient of the loss function, using suitable techniques known to those of ordinary skill in the art. In some embodiments, a regularization term (e.g., weight decay) is applied in the hardware-aware training process for the free parameters β and γ (and optionally β).

As noted above, after completion of the hardware-aware training process, the learned weight matrices are implemented in RPU arrays of the RPU hardware, and the bound management circuitry is configured to implement the learned input scaling parameters β (for each layer) and the learned output scaling parameters $$\sigma = \left(\alpha \frac{\gamma}{\gamma_o}\right)$$

(for each layer). In addition, in an embodiment where the parameter β is free parameter that is learned by the hardware-aware training process, the signal bound of the readout circuitry of the RPU hardware (e.g., ADC gain) is configured according to the learned parameter β for each layer of the trained artificial neural network model implemented on the RPU hardware.

Furthermore, once the trained artificial neural network model is implemented on the analog RPU system, inference/classification processing can be performed using the configured analog RPU system. As noted above, during an analog forward pass operation, the digital input vector X, which is input to a given layer, is dived by the input scaling parameter input scaling parameter $\alpha$ which is set for the given layer to generate a scaled input vector X'. In some embodiments, the scaled vector values of X/$\alpha$, which are less than $-1$ or greater than $-1$, are clipped to values of $-1$ and 1. The analog forward pass is performed to compute an output vector Y'=WX', and the resulting output vector Y' is scaled by the learned output scaling parameters $$\sigma = \left( \alpha \frac{\gamma}{\gamma_o} \right)$$

for the given layer to generate the output vector Y=Y'$\sigma$.

As noted above, the exemplary embodiments described herein provide bound management techniques which reduce the runtime cost (digital and analog compute) necessary for dynamic noise and bound management methods. The exemplary embodiments utilize a hardware-aware training process to learn input/output scaling parameters. Computer simulation have shown that such techniques provide no or relatively small impact on the accuracy for analog inference for LSTM models and CNN models.

Exemplary embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
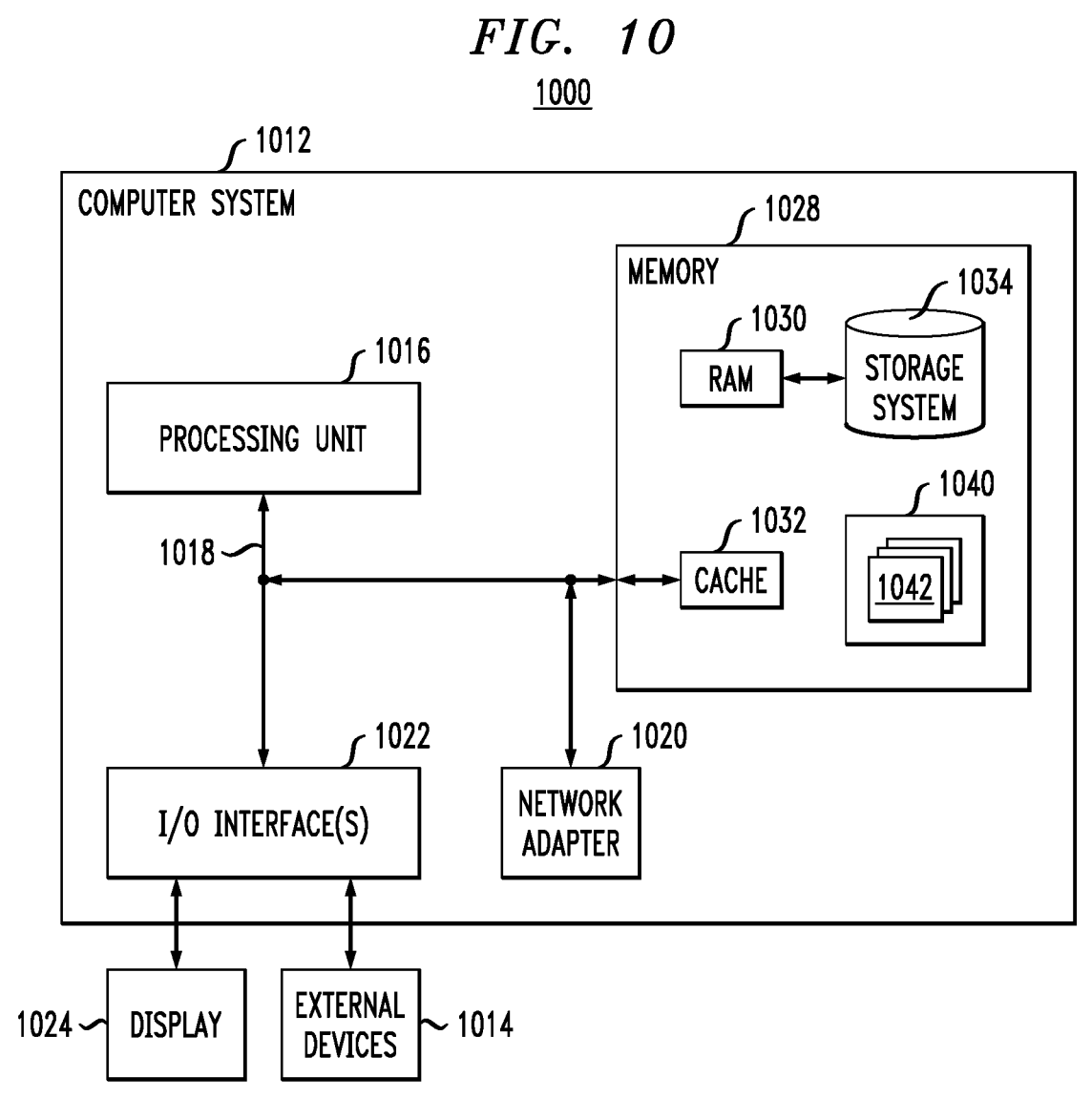

These concepts are illustrated with reference to FIG. 10, which schematically illustrates an exemplary architecture of a computing node that can host the computing system of FIG. 1, according to an exemplary embodiment of the disclosure. FIG. 10 illustrates a computing node 1000 which comprises a computer system/server 1012, which is operational within numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

In FIG. 10, computer system/server 1012 in computing node 1000 is shown in the form of a general-purpose computing device. The components of computer system/server 1012 may include, but are not limited to, one or more processors or processing units 1016, a system memory 1028, and a bus 1018 that couples various system components including system memory 1028 to the processors 1016.

The bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1012 typically includes a variety of computer system readable media. Such media may be any available media that is accessible by computer system/server 1012, and it includes both volatile and non-volatile media, removable and non-removable media.

The system memory 1028 can include computer system readable media in the form of volatile memory, such as random-access memory (RAM) 1030 and/or cache memory 1032. The computer system/server 1012 may further include other removable/non-removable, volatile/nonvolatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As depicted and described herein, memory 1028 may include at least one program product having a set (e.g., at least one) of program modules that are configured to carry out the functions of embodiments of the invention.

The program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the disclosure as described herein.

Computer system/server 1012 may also communicate with one or more external devices 1014 such as a keyboard, a pointing device, a display 1024, etc., one or more devices that enable a user to interact with computer system/server 1012, and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, SSD drives, and data archival storage systems, etc.

Additionally, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
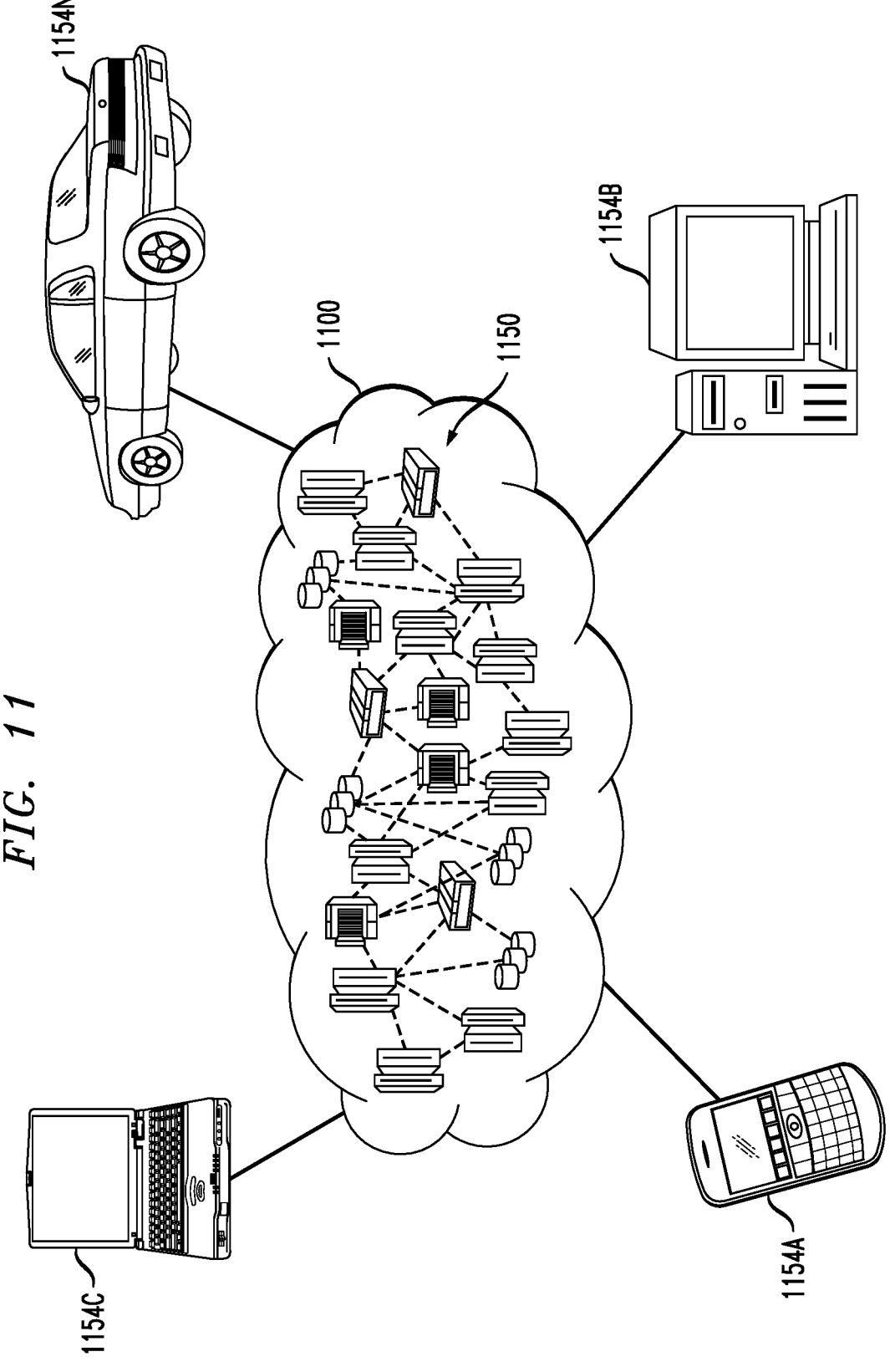
FIG. 11 depicts a cloud computing environment according to an exemplary embodiment of the disclosure.

Referring now to FIG. 11, illustrative cloud computing environment 1100 is depicted. As shown, cloud computing environment 1100 includes one or more cloud computing nodes 1150 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1150 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1150 and cloud computing environment 1100 can communicate with any type of computerized device over any type of network and/or network addressable connection (e.g., using a web browser).

Figure 12:
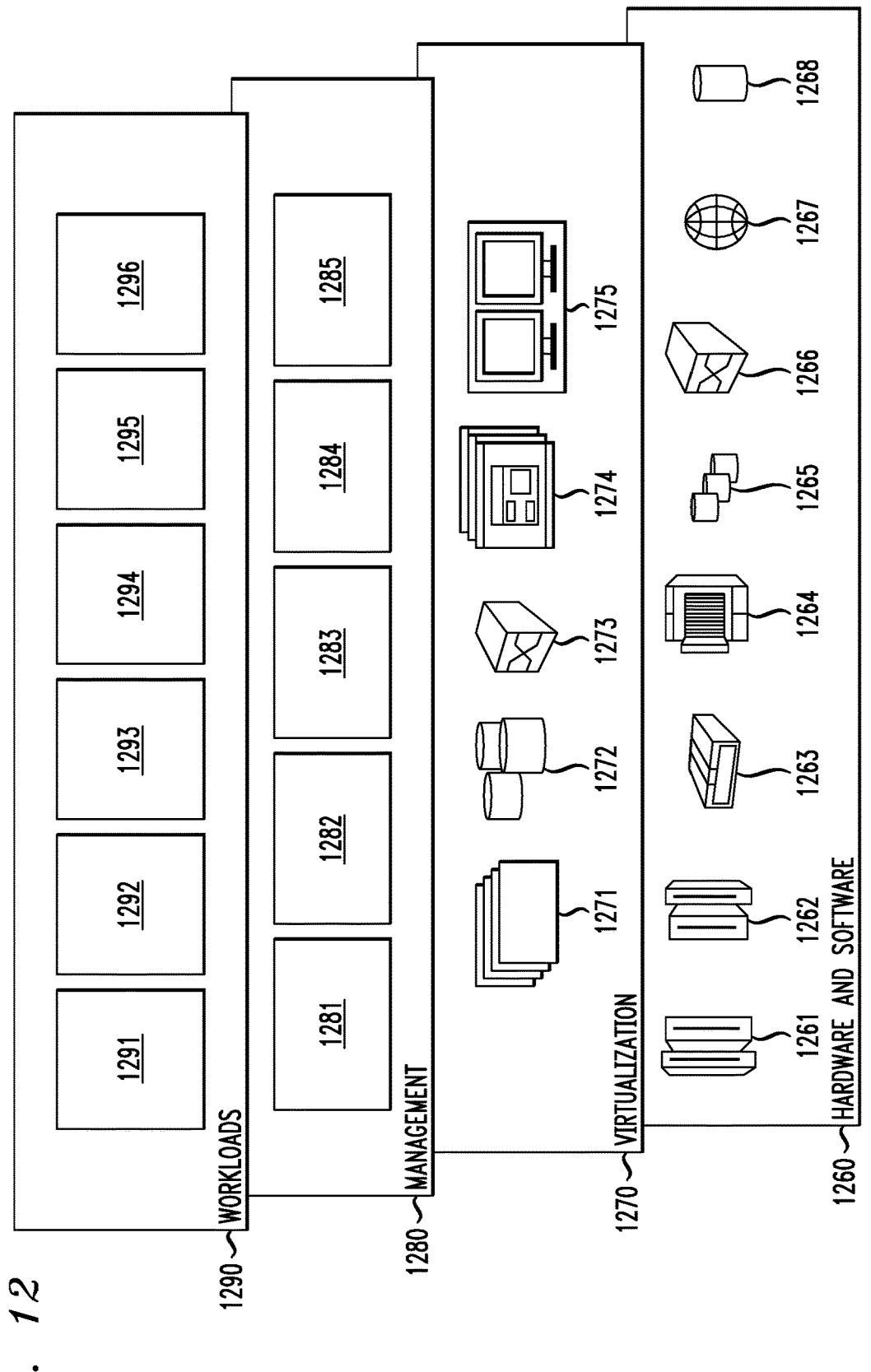
FIG. 12 depicts abstraction model layers according to an exemplary embodiment of the disclosure.

Referring now to FIG. 12, a set of functional abstraction layers provided by cloud computing environment 1100 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and various functions 1296 that are implemented by the exemplary systems and methods as discussed above in conjunction with, e.g., FIGS. 1-9. Furthermore, in some embodiments, the hardware and software layer 1260 would include, e.g., the computing system 100 of FIG. 1 to implement or otherwise support the various workloads and functions 1296 for performing such hardware accelerated computing and analog in-memory computations.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising one or more processors configured to:

perform a first training process to train a first artificial neural network model;

perform a second training process to retrain the first artificial neural network model using matrix-vector compute operations which are a function of bound management parameters of an analog resistive processing unit system, to thereby generate a second artificial neural network model with learned static bound management parameters; and configure the analog resistive processing unit system to implement the second artificial neural network model and the learned static bound management parameters.

2. The system of claim 1, wherein in performing the second training process, the one or more processors are configured to modify an architecture of the first artificial neural network model by replacing matrix-vector compute operations for weight matrices of the first artificial neural network model with the matrix-vector compute operations which are a function of the bound management parameters of the analog resistive processing unit system.

3. The system of claim 1, wherein the bound management parameters comprise an input vector scaling parameter and an output vector scaling parameter, and wherein the learned static bound management parameters comprise a static input vector scaling parameter and a static output vector scaling parameter for at least one layer of the second artificial neural network model.

4. The system of claim 3, wherein the output vector scaling parameter is a function of the input vector scaling parameter.

5. The system of claim 1, wherein the bound management parameters comprise a signal bound parameter associated with readout circuitry of the analog resistive processing unit system.

6. The system of claim 5, wherein the signal bound parameter is one of a fixed parameter and a learned parameter.

7. The system of claim 1, wherein the matrix-vector compute operations comprise clipping functions to clip scaled vector input values to a first specified range, and to clip results of the matrix-vector compute operations to second specified range matrix-vector compute operations.

8. The system of claim 7, wherein the first specified range comprises a range of −1 to 1, and wherein the second specified range is based on a signal bound parameter associated with readout circuitry of the analog resistive processing unit system.

9. The system of claim 1, wherein in configuring the analog resistive processing unit system to implement the second artificial neural network model and the learned static bound management parameters, the one or more processors are configured to:

program at least one array of resistive processing unit cells array to implement at least one learned synaptic weight matrix of the second artificial neural network model; and configure bound management circuitry of the analog resistive processing unit system to implement the learned static bound management parameters for at least one layer of the second artificial neural network model.

10. A computer program product, comprising:

one or more computer readable storage media, and program instructions collectively stored on the one or more computer readable storage media, the program instructions comprising:

program instructions to perform a first training process to train a first artificial neural network model;

program instructions to perform a second training process to retrain the first artificial neural network model using matrix-vector compute operations which are a function of bound management parameters of an analog resistive processing unit system, to thereby generate a second artificial neural network model with learned static bound management parameters; and program instructions to configure the analog resistive processing unit system to implement the second artificial neural network model and the learned static bound management parameters.

11. The computer program product of claim 10, wherein the program instructions to perform the second training process comprise program instructions to modify an architecture of the first artificial neural network model by replacing matrix-vector compute operations for weight matrices of the first artificial neural network model with the matrix-vector compute operations which are a function of the bound management parameters of the analog resistive processing unit system.

12. The computer program product of claim 10, wherein the bound management parameters comprise an input vector scaling parameter and an output vector scaling parameter, and wherein the learned static bound management parameters comprise a static input vector scaling parameter and a static output vector scaling parameter for at least one layer of the second artificial neural network model.

13. The computer program product of claim 12, wherein the output vector scaling parameter is a function of the input vector scaling parameter.

14. The computer program product of claim 10, wherein the bound management parameters comprise a signal bound parameter associated with readout circuitry of the analog resistive processing unit system.

15. The computer program product of claim 14, wherein the signal bound parameter is one of a fixed parameter and a learned parameter.

16. The computer program product of claim 10, wherein the matrix-vector compute operations comprise clipping functions to clip scaled vector input values to a first specified range, and to clip results of the matrix-vector compute operations to second specified range.

17. The computer program product of claim 16, wherein the first specified range comprises a range of −1 to 1, and wherein the second specified range is based on a signal bound parameter associated with readout circuitry of the analog resistive processing unit system.

18. The computer program product of claim 10, wherein the program instructions to configure the analog resistive processing unit system to implement the second artificial neural network model and the learned static bound management parameters, comprise:

program instructions to program at least one array of resistive processing unit cells array to implement at least one learned synaptic weight matrix of the second artificial neural network model; and program instructions to configure bound management circuitry of the analog resistive processing unit system to implement the learned static bound management parameters for at least one layer of the second artificial neural network model.

19. A neuromorphic computing system, comprising:

a resistive processing unit system configured to implement a trained artificial neural network;

wherein the resistive processing unit system comprises bound management circuitry configured to apply a static input vector scaling parameter to digital input vectors that are input to a synaptic weight matrix of at least one layer of the trained artificial neural network, and to apply a static output vector scaling parameter to digital output vectors that are generated by performing matrix-vector operations on the synaptic weight matrix of the at least one layer of the trained artificial neural network; and wherein the static input vector scaling parameter and the static output vector scaling parameter are learned parameters that are learned as part of a training process performed to train the artificial neural network implemented by the resistive processing unit system.

20. The neuromorphic computing system of claim 19, wherein the static output vector scaling parameter is a function of the static input vector scaling parameter.

\* \* \* \* \*